United States Patent [19]

Kregness

[11] Patent Number: 4,592,005
[45] Date of Patent: May 27, 1986

[54] MASKED ARITHMETIC LOGIC UNIT

[75] Inventor: Glen R. Kregness, Minnetonka, Minn.

[73] Assignee: Sperry Corporation, New York, N.Y.

[21] Appl. No.: 395,519

[22] Filed: Jul. 6, 1982

[51] Int. Cl.$^4$ .......................... G06F 7/38; G05F 7/50
[52] U.S. Cl. .................................... 364/736; 364/768
[58] Field of Search ................ 364/716, 200 MS File, 364/900 MS File, 786, 788, 770, 715, 736, 768; 307/465

[56] References Cited

U.S. PATENT DOCUMENTS

| | | | |
|---|---|---|---|
| 3,505,511 | 4/1970 | Campano et al. | 364/770 |
| 3,752,394 | 8/1973 | Igel | 364/716 |
| 3,925,651 | 12/1975 | Miller | 364/716 |
| 3,999,052 | 12/1976 | Gooding et al. | 364/786 |
| 4,047,247 | 9/1977 | Stanley et al. | 364/200 |
| 4,064,421 | 12/1977 | Gajski et al. | 364/716 |
| 4,139,899 | 2/1979 | Tulpule et al. | 364/900 |
| 4,199,811 | 4/1980 | Bogerson et al. | 364/200 |
| 4,317,170 | 2/1982 | Wada et al. | 364/200 |
| 4,390,970 | 6/1983 | Kay | 365/73 |
| 4,396,982 | 8/1983 | Wada et al. | 364/200 |
| 4,467,444 | 8/1984 | Harmon, Jr. et al. | 364/736 |

OTHER PUBLICATIONS

Jeremiah, T. L., "ALU with Integral Leading Zero Counter", *IBM Technical Disclosure Bulletin*, vol. 23, #1, Jun. 1980, pp. 25–26.

Quanstrom, J. L., Programmable Logic Element Processor", *IBM Technical Disclosure Bulletin*, vol. 21, #10, Mar. 1979, pp. 3916–3918.

*Primary Examiner*—James D. Thomas
*Assistant Examiner*—Dale M. Shaw
*Attorney, Agent, or Firm*—Charles A. Johnson; Kenneth T. Grace; Marshall M. Truex

[57] ABSTRACT

An improved masked arithmetic logic unit is disclosed which incorporates at least three principle unique features to optimize implementation in a high speed environment. These features are (1) the inclusion of a mask operand to facilitate mask compares and mask substitute operations without adding logic levels to the arithmetic logic unit; (2) the inclusion of a sum minus one network to speed up system performance by minimizing the delay usually associated with group borrow input to final sum output and (3) the inclusion of a mode control register internal to the arithmetic logic unit to minimize or camouflage the delay always found in the mode switching control of contemporary arithmetic logic units.

10 Claims, 25 Drawing Figures

| Fig. 6a | Fig. 6b |

TABLE OF FUNCTIONS

| MODE (OCTAL) | C0 | C1 | C2 | C3 | C4 | C5 | C6 | C7 | FUNCTION | GROUP |
|---|---|---|---|---|---|---|---|---|---|---|
| 00 | L | L | L | L | H | H | L | L | A−B | BASIC ARITH |
| 01 | L | L | H | L | H | H | L | L | A PLUS B | |
| 02 | H | L | L | L | H | H | L | L | −A−B | |
| 03 | H | L | H | L | H | H | L | L | B−A | |
| 04 | L | L | L | L | L | H | L | L | AM−BM | MASKED ARITH |
| 05 | L | L | H | L | L | H | L | L | AM−$\overline{B}$M | |
| 06 | H | L | L | L | L | H | L | L | $\overline{A}$M−BM | |
| 07 | H | L | H | L | L | H | L | L | $\overline{A}$M−$\overline{B}$M | |
| 10 | L | L | L | H | H | H | H | H | A | A VARIENTS |
| 11 | L | L | H | H | H | H | H | H | $\overline{A}$ | |
| 12 | H | L | L | L | H | H | H | H | A ⊕ B | X OR COINCIDENCE |
| 13 | H | L | H | L | H | H | H | H | A $\overline{\oplus}$ B | |
| 14 | L | H | L | H | H | H | H | H | NEG. ZERO | ALL ONES ALL ZEROS |
| 15 | L | H | H | H | H | H | H | H | POS. ZERO | |
| 16 | H | H | L | L | H | H | H | H | $\overline{B}$ | B VARIENTS |
| 17 | H | H | H | L | H | H | H | H | B | |
| 20 | L | L | L | L | H | L | L | H | A$\overline{B}$ | AND VARIENTS |
| 21 | L | L | H | L | H | L | L | H | AB | |
| 22 | H | L | L | L | H | L | L | H | $\overline{A}\overline{B}$ | |
| 23 | H | L | H | L | H | L | L | H | $\overline{A}$B | |
| 24 | L | H | L | L | L | L | L | H | $\overline{B}$M + A$\overline{M}$ | MASKED LOGICAL VARIENTS |
| 25 | L | H | H | L | L | L | L | H | BM + A$\overline{M}$ | |
| 26 | H | H | L | L | L | L | L | H | A$\overline{M}$ | |
| 27 | H | H | H | L | L | L | L | H | A$\overline{M}$ | |
| 30 | L | L | L | L | H | L | H | H | $\overline{A}$ + B | OR VARIENTS |
| 31 | L | L | H | L | H | L | H | H | $\overline{A}$ + $\overline{B}$ | |
| 32 | H | L | L | L | H | L | H | H | A + B | |
| 33 | H | L | H | L | H | L | H | H | A + $\overline{B}$ | |
| 34 | L | H | L | L | L | L | H | H | (B or $\overline{M}$) ($\overline{A}$ or M) | MASKED LOGICAL VARIENTS |
| 35 | L | H | H | L | L | L | H | H | ($\overline{B}$ or $\overline{M}$) ($\overline{A}$ or M) | |
| 36 | H | H | L | L | L | L | H | H | $\overline{A}$ + M | |
| 37 | H | H | H | L | L | L | H | H | $\overline{A}$ + M | |

*Fig. 12*

MASKED ARITHMETIC LOGIC UNIT

BACKGROUND OF THE INVENTION

A. Field of the Invention

This invention relates to an arithmetic logic unit, which is a device utilized in the arithmetic section of contemporary data processing systems. These devices are used to implement the basic functions found in most computer repertoires, such as add, subtract, AND, OR, or Exclusive OR.

B. Prior Art

Originally, in carrying out the four basic arithmetic processes—addition, subtraction, multiplication and division—people made extensive use of tables of sums, differences and products that they had memorized. Reference to such tables, however, seriously slowed down the progress of a computation, equally so when it is carried out by a computer. Wired circuits that automatically provide the solution as output, given the operands as input, are, of course, much faster. A few older computers did, in fact, use tables.

In the case of addition, since the computer represents numbers to the base 2 it need only provide for three possible combinations of operands: 0 and 0, 0 and 1, and 1 and 1.

Usually, arithmetic processes, such as subtraction, are carried out by means of complements. For example, subtraction may be defined as the addition of two quantities after reversing the sign of one of them. In most computers, subtraction is carried out by adding the complement of the number to be subtracted. The complement of a number is obtained by subtracting it from the next highest power of the base. This is called 10's complementing if the base is 10. The complement can also be obtained by subtracting it from the next highest power of the base less 1. This is called 9's complementing if the base is 10. If the base if 2, these complements are respectively called 2's complements and 1s complements, respectively.

Thus, the 2's complement of $101_2 = 1000_2 - 101_2 = 011_2$ and the 1's complement of $101_2 = 111_2 - 101_2 = 010_2$. Note the practice of carrying the same number of digits in the complement as appeared in the original number. Also, since the only possible digits for a binary are 0 and 1 and since $1 - 1 = 0$ and $1 - 0 = 1$, the 1's complement of a binary number is obtained by merely reversing the digits.

Every attempt has been made, in past machines, to speed up the execution of arithmetical operations by multiplexing techniques. In at least one known machine, the arithmetic unit consisted of a parallel unit and a serial unit. The parallel unit performed floating point operations and the serial unit variable field length operations. The two units used the same two arithmetic registers. Namely, a double length accumulator register consisting of two 64 bit registers (A&B), and a double length operand register consisting of two 64 bit registers (C&D). The common use of these registers enabled the machine to shift between floating point and variable field length operations at any time.

Thus, the result obtained from a floating point operation could serve as a starting operand for a variable field length operation and vice versa. However, in spite of improvements, earlier arithmetic units were limited in size and capability in that they had fixed designs which could only accomplish arithmetic functions.

The arithmetic section of contemporary computers utilizer devices commonly referred to as Arithmetic Logic Units (ALU's) to implement the basic functions found in most present day computer repertoires such as add, subtract, AND, OR, and exclusive OR. The devices are used as basic building blocks which are linked together to form adders of the desired width. Intergroup borrow or carries from the individual ALU devices, which are commonly available in 4-8 bit groups, are grouped and distributed back in a section referred to as the carry or borrow lookahead logic. While these devices perform most of the basic arithmetic and logical functions required, they do not allow for masked operations commonly found in many contemporary computers. These operations, such as masked compare and field substitute, require either additional hardware between the source data and the ALU or multiple passes through the ALU, using the basic primitive functions provided to implement the desired function. Additional hardware in the prime data path is undesirable since all operations are slowed down due to the additional delay imposed by this hardware. Multiple passes through the ALU also slows down these instructions requiring the additional sequencing.

A further weakness of these devices is that they are not optimized in their external borrow or carry structures from a system implementation point of view. In modern high-speed computers, interconnection of these devices makes up a large percentage of the total delay of the full adder. To optimize the adder design, it is important that the adder design place the greatest emphasis on the generation of group borrows or carries and group propagate signals. It is equally important to combine borrow or carry signals into a group to sum or difference output of the device. Most available devices perform respectably in borrow or carry generation but do not optimize borrow or carry in to data out.

Another weakness of these devices is the added delay imposed by the mode control lines which select the function the ALU is to perform. In a system which attempts to use the ALU at full capacity by cycling new data and new ALU modes on consecutive machine cycles, both data and control information arrive at the same time in the ALU. ALU delays are thereby controlled by the slowest overall path which normally is the control path.

BRIEF DESCRIPTION OF THE INVENTION

A. Object of the Invention

Accordingly it is an object of the invention to provide a unique and improved arithmetic logic unit which allows the masked operations commonly found in other operating segments of present day computers to also be included in the unit.

It is another object of the present invention to include these masked operations in a contemporary arithmetic logic unit which inclusion does not require additional hardware between the source data and the arithmetic logic unit nor does it require multiple passes through the arithmetic logic unit.

It is still another object of this invention to provide an arithmetic logic unit whose external borrow and carry structures have been optimized from a system implementation viewpoint.

It is a still further object of this invention to provide an arithmetic logic unit design which places great emphasis on and enhances the generation of group borrows or carries and group propagation signals as well as to the relationship of borrow or carries input relative to sum or difference outputs of the device.

It is also an object of the present invention to provide an arithmetic logic unit which includes internal mode control signals to thereby reduce the delays imposed by the late arrival of external control signals, since ALU delays are always controlled by the slowest overall signal path and that is usually the control signal path.

Yet another object is to provide an improved multi-function ALU having improved mode control.

B. Summary of the Invention

This invention discloses a unique arithmetic control unit for use in a high speed environment. The unit includes the capability of performing masking operations without the addition of further logic levels to its design. It also includes a network for speeding up system arithmetic logic unit performance by minimizing the delay associated with group borrow input to final sum output. Finally, it reduces the usual delay associated with arithmetic logic unit mode switching. These features are the addition of a mask operand to facilitate masked compares and masked substitute operations without adding logic levels to the ALU, the inclusion of a sum minus one network to speed up system ALU performance by minimizing the delay associated with group borrow input to final sum output, and the inclusion of a mode control register internal to the ALU to minimize the delay of ALU mode switching.

BRIEF DESCRIPTION OF THE SEVERAL VIEWS OF THE DRAWINGS

The foregoing objects and the summary will be more readily understood when read in conjunction with the accompanying drawings in which:

FIG. 12 is a table of functions which taken with FIG. 1 illustrates the output signals produced for when particular input signals are applied.

DETAILED DESCRIPTION OF THE INVENTION

Figure 1:
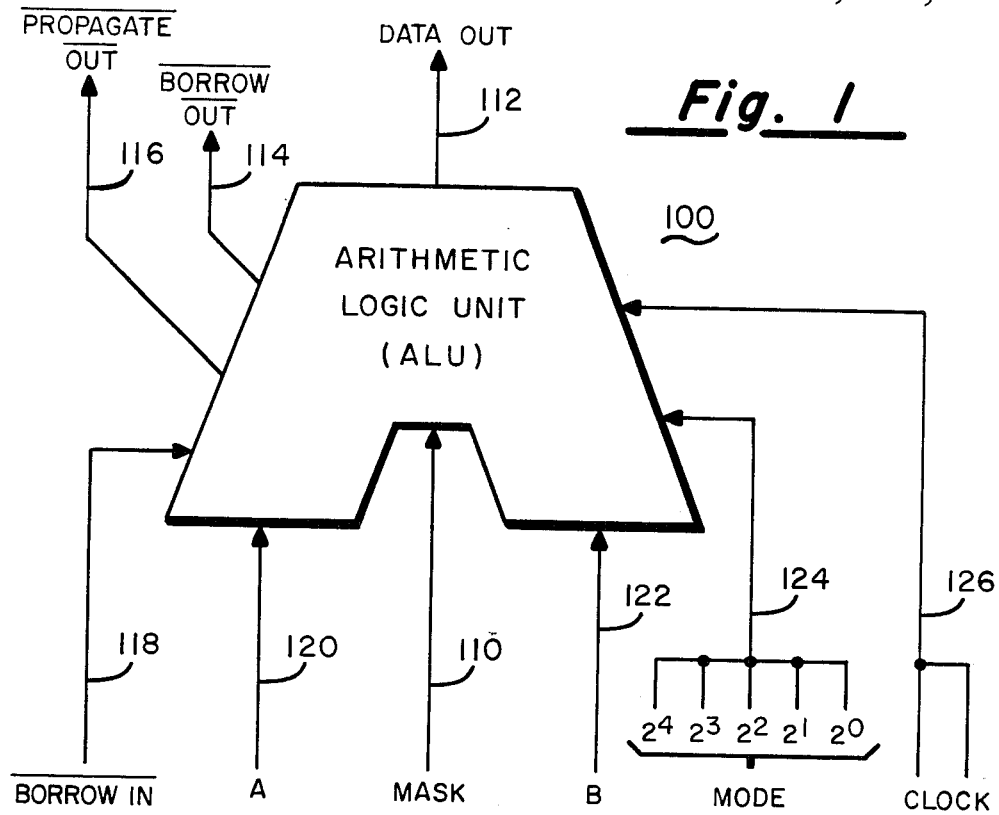
FIG. 1 is a single block diagram of the arithmetic logic unit of the present invention showing the respective input/output signals.

The following detailed description will be more easily comprehended when it is read with reference to the foregoing drawings in which like reference characters symbolize corresponding parts.

FIG. 1 illustrates the overall single block arithmetic logic unit (ALU) 100 with its respective input lines and output lines.

The input signal operands A,120 and B,122 are applied, in combination with the mask input 110. The other input signals include the $\overline{\text{borrow in}}$ signal 118, the mode signals 124, and the clock signals 126. The output signals produced are the dataout 112, the $\overline{\text{borrow out}}$ signal 114 and the $\overline{\text{propagate out}}$ signal 116.

Figure 2:
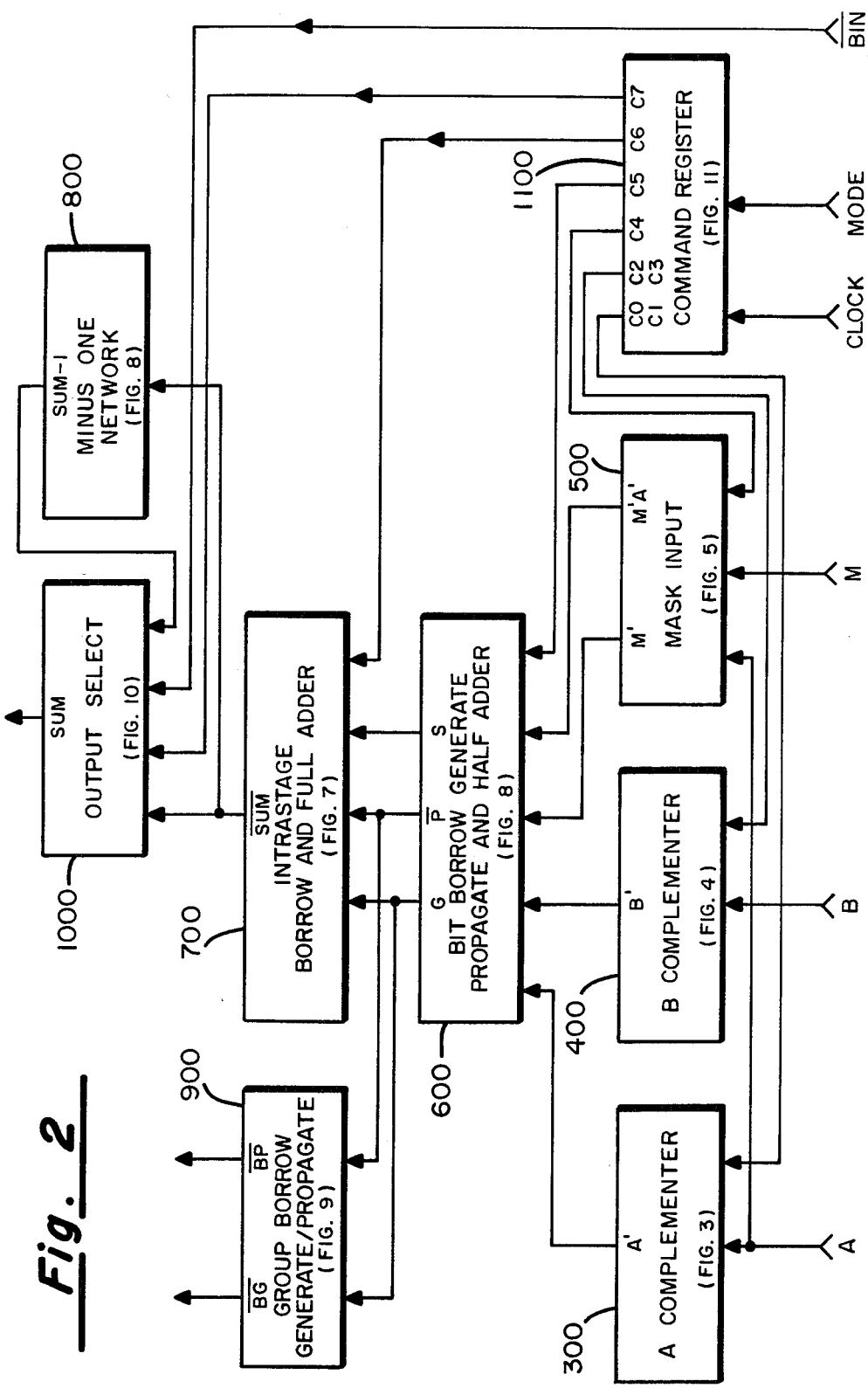
FIG. 2 is a generalized block diagram showing the various block portions of the single arithmetic block diagram of FIG. 1.

This entire unit 100 is now shown in FIG. 2 in a more detailed block diagram which illustrates the internal configuration of the unit. Also noted in each block is the figure number of the present drawings which reveals the logical detail of that particular block. The design of the present arithmetic logic unit 100 may be subdivided into several general sections. They are the A and B complementers 300, 400, the bit borrow generate, propagate and half-adder 600, the mask input 500, the intrastage borrow and full-adder 700, the minus one network 800, the group borrow generate and propagate section 900, the borrow input and output selection means 1000 and the command register and mode control selection unit 1100.

The last named command register and mode control selection unit 1100 will be more completely described with reference to FIG. 11. However, it should be noted here generally that this unit generates a plurality of control signals C0 through C7 which are selectively used in conjunction with each of the logic levels. These signals C0 through C7 provide the basic mode controls for the entire arithmetic logic unit. They are selectively used, as will become apparent in this description, to change the operating mode or configuration of each of the subunits.

For example, control signals C0 and C1 operate in conjunction with the A input complementer to controllably shift its operating mode, whereas control signals C2 and C3 operates in the same manner with the B input complementer.

Figure 3:
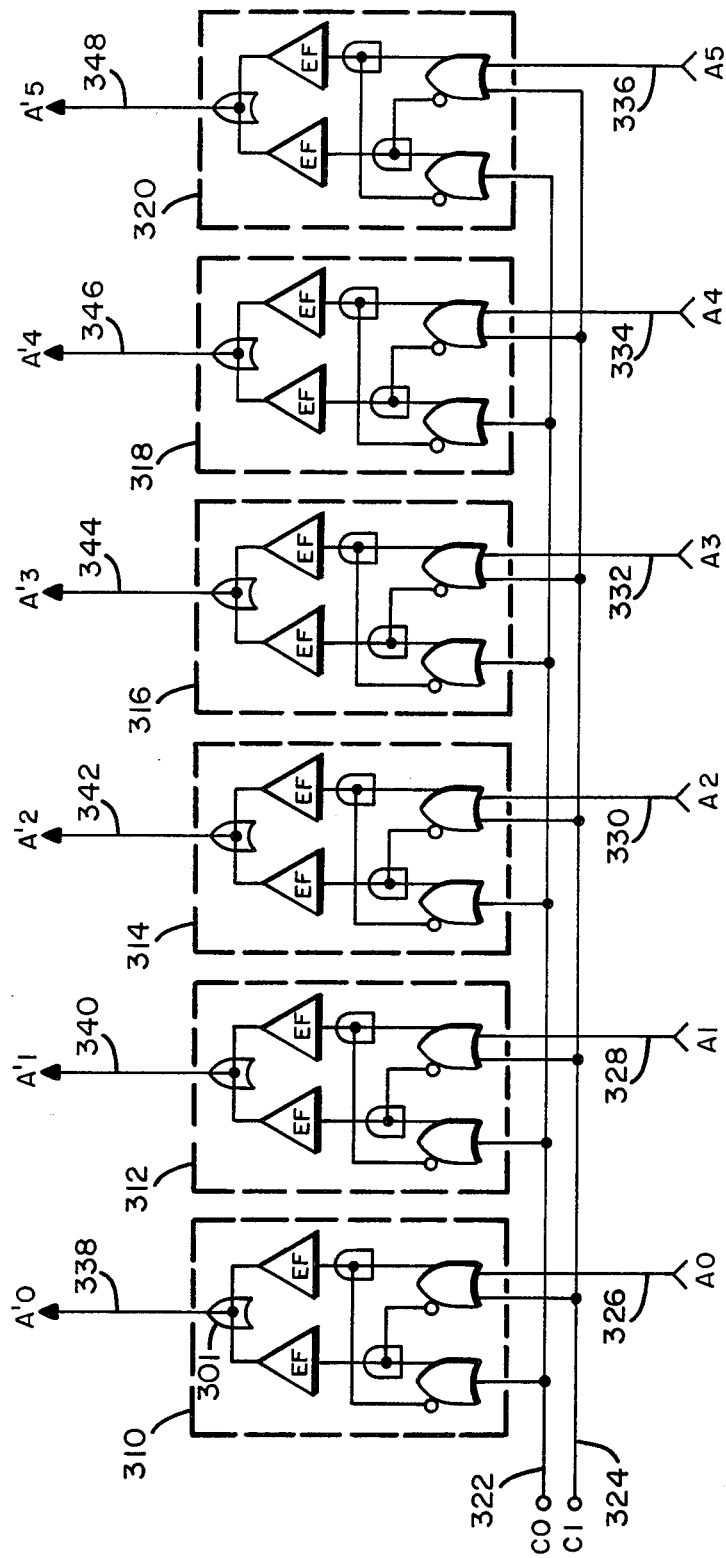
FIG. 3 illustrates the logical configuration of the six stage input A complementer.
Figure 4:
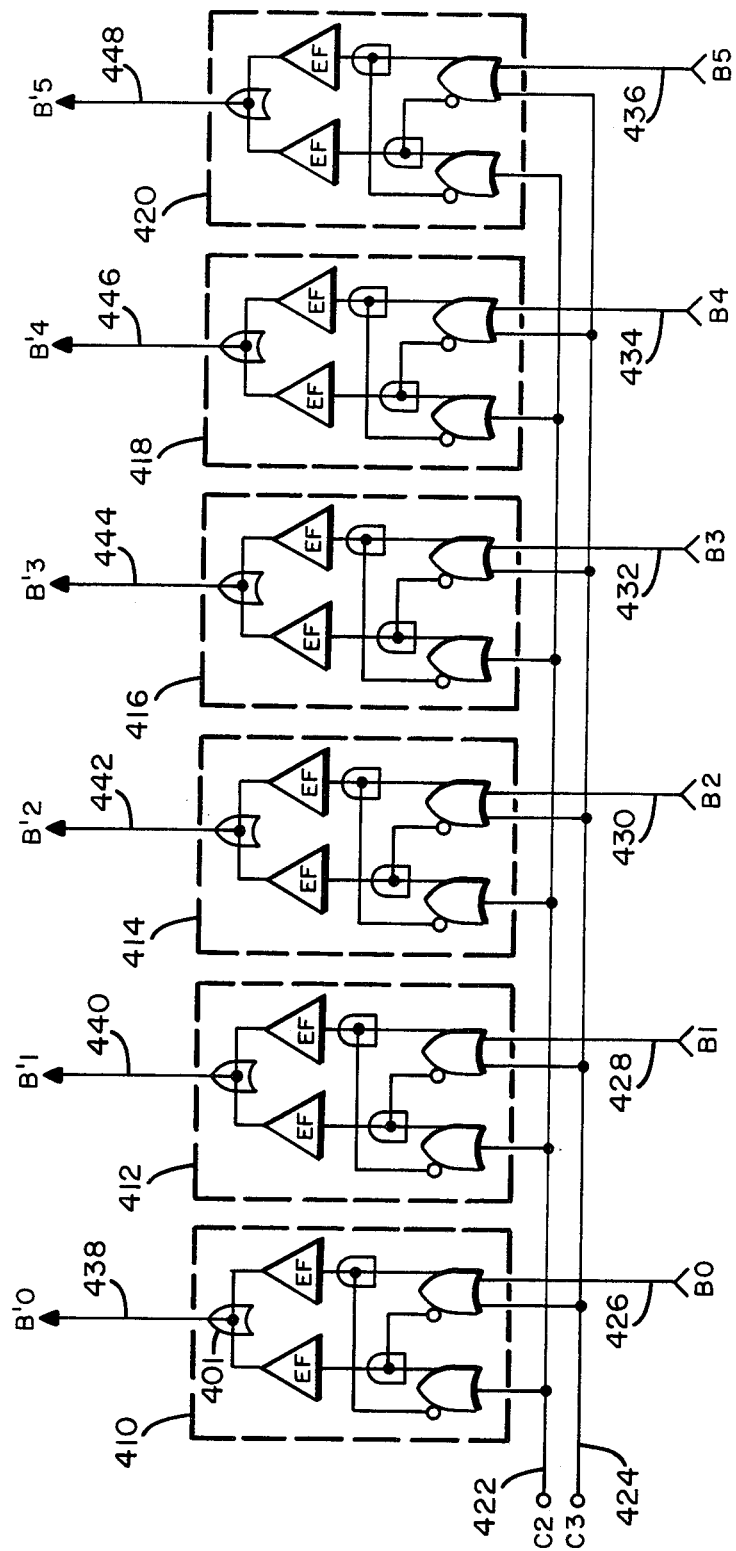
FIG. 4 illustrates the logical configuration of the six stage input B complementer.

FIG. 3 and FIG. 4 illustrate the A and B input complementers 300, 400 respectively. Each figure has associated with it a table which shows how the control signals control each of the complementers to produce particular outputs on A' and B'.

The A input complementer of FIG. 3 is made up of a plurality of gated exclusive OR gates 310-320 to provide the function of complementing the A input or to inhibit an A input which forces the output of the complementer to a one or a zero. This mode shift between complementing and inhibiting is accomplished by combinations of control signal levels C0 and C1. The various combinations of high and low logic levels are illustrated in the appropriate tables associated with each of FIG. 3 and FIG. 4. The gates 310-320 thus receive inputs 326-336 respectively to provide ones or zeros at the outputs 336-348 under the control of control signals 322 and 324, C0 and C1 respectively. These output signals 338-348 are thereafter presented to the bit generate, propagate and half-adder section 600 shown in FIG. 6. The primary function of the complementers is to provide the basic functions of subtract, reverse subtract and complement add. It is also used for other logic functions.

Referring again to FIG. 3, the exclusive OR gate 310 is comprised of a pair of OR gates, each having a low and a high output terminal. The high terminal of one OR gate is connected to the low terminal of the other OR gate and vice versa.

Although each of these connections is shown as an AND gate, in reality only a wired connection exists. Similarly the outputs of the pair of emitter followers are also wired together, and shown as a gate 301, when in reality it is a permanently wired connection which provides the output signal 338.

Likewise, the B input complementer shown in FIG. 4 is comprised of a plurality of exclusive OR gates 410–420. It provides the function of complementing or inhibiting the B inputs 426–436 to force the outputs 438–448 of the complementers to ones and zeros. Again the primary function of the B complementers is to provide the basic functions of subtract, reverse subtract and complement add but it is also used for some of the logic functions. A corresponding table of input/output signals under both control signals C2 and C3 is illustrated.

As previously noted with respect to FIG. 3, the control signals C2 and C3 emanate from the command register and mode control selection unit shown as 1100 in FIG. 2. They operate in conjunction with the B input complementer in the same manner as control signals C0 and C1 operated with the A input complementer.

Similarly, the exclusive OR gate 410 is configured in exactly the same manner as exclusive OR gate 310 and the common output gate 401 is, as mentioned previously, really only a permanently wired interconnection.

Figure 5:
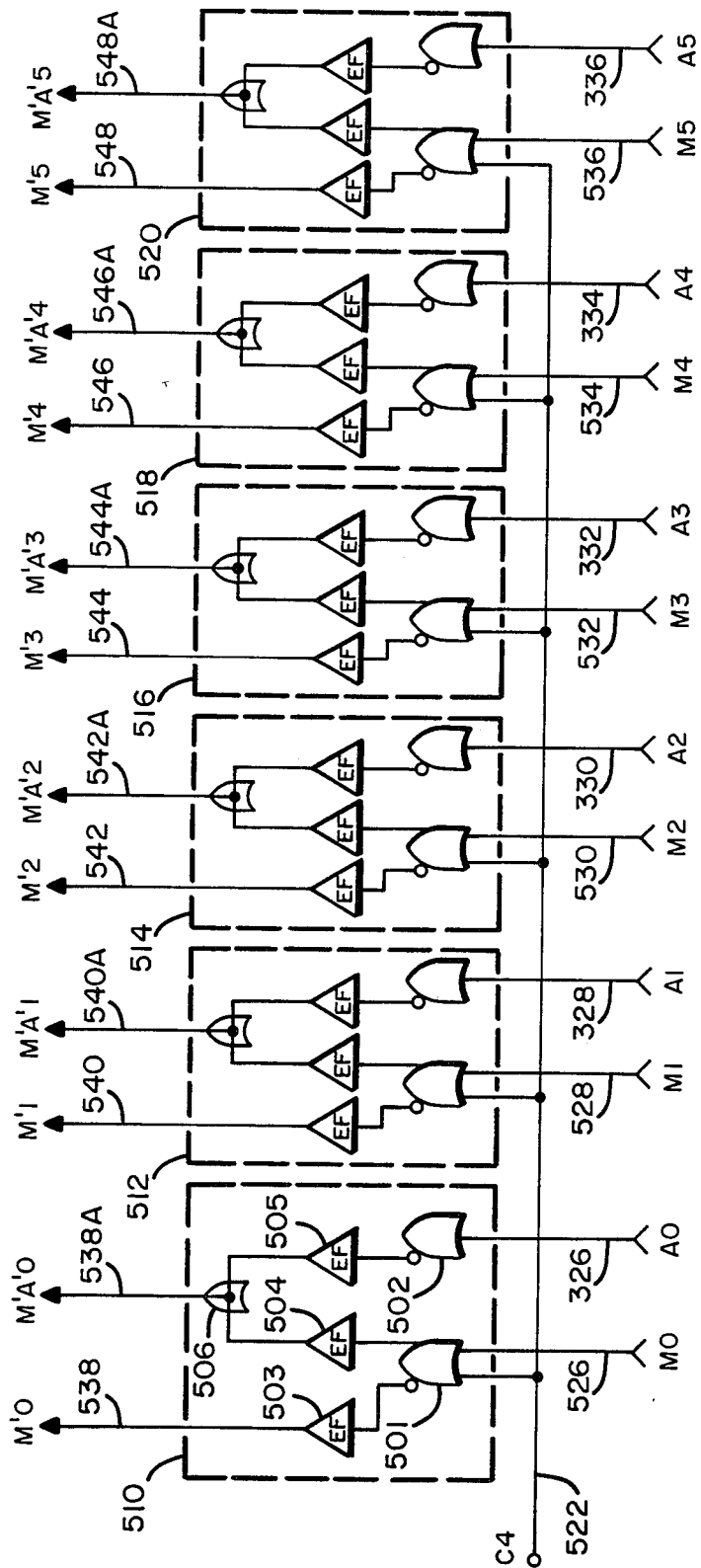
FIG. 5 shows the six stage input mask logical configuration.

The mask input logic is shown in FIG. 5. It provides for the input gating of the mask inputs and the first level combining of the mask input lines with the A operand terms for the masked substitute operation. This first level operation produces the function of MA in complement form. Both the gates mask term $M'_n$ and the term $M'A'_n$ are applied to the bit generate, propagate, sum network 600 of FIG. 6 together with the output of the complementers. C4 is the control line enabling the mask operation of the ALU.

This control signal C4 also originates at the command register and mode control selection unit 1100 shown in FIG. 2. When M0 is high i.e. selected or in control, the signal A0 is ignored, whereas, when M0 is low i.e. not selected, A0 is passed through unchanged.

To take one example, since all of the masked gated inputs are identical, the M0 input signal 526 is gated by OR gate 501 under the control of control signal 522 to provide a high output signal to emitter follower 503 whose output signal 538 is the mask signal M'0. Similarly, the A0 input signal 326 is gated via OR gate 502 to emitter follower 505. A low output signal from OR gate 501 is sent to emitter follower 504. The output of the emitter followers 504 and 505 are combined via wired gate 506 to provide the output signal 538A which corresponds to the M40 A'0 signal. The remaining dotted sections 512–520 operate in the identical manner for related bit positions.

Figures 6, 6A:
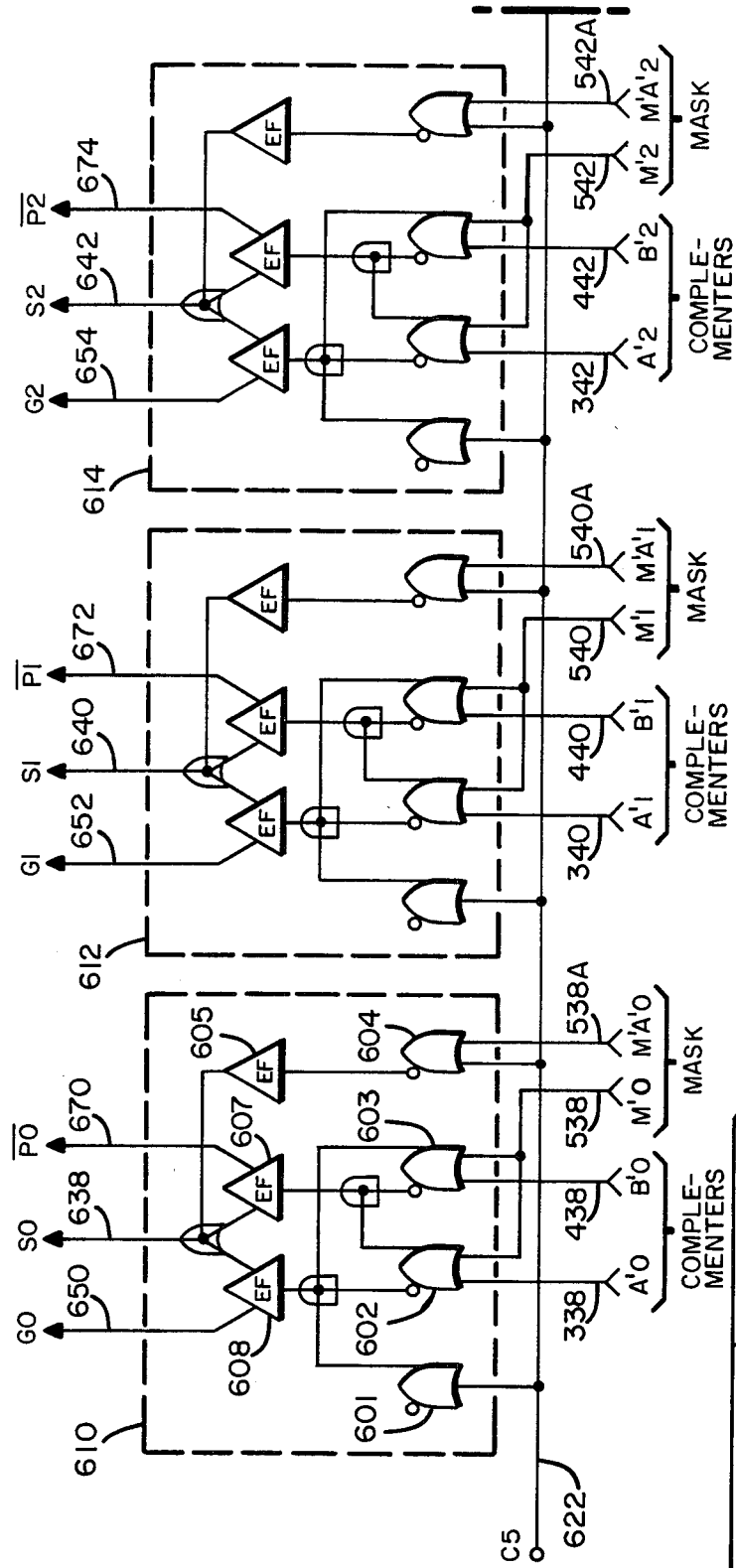
FIG. 6 includes FIG. 6A and FIG. 6B, and positioned as shown, illustrates the bit generate, the propagate and the half-adder portions of the ALU.
Figure 6B:
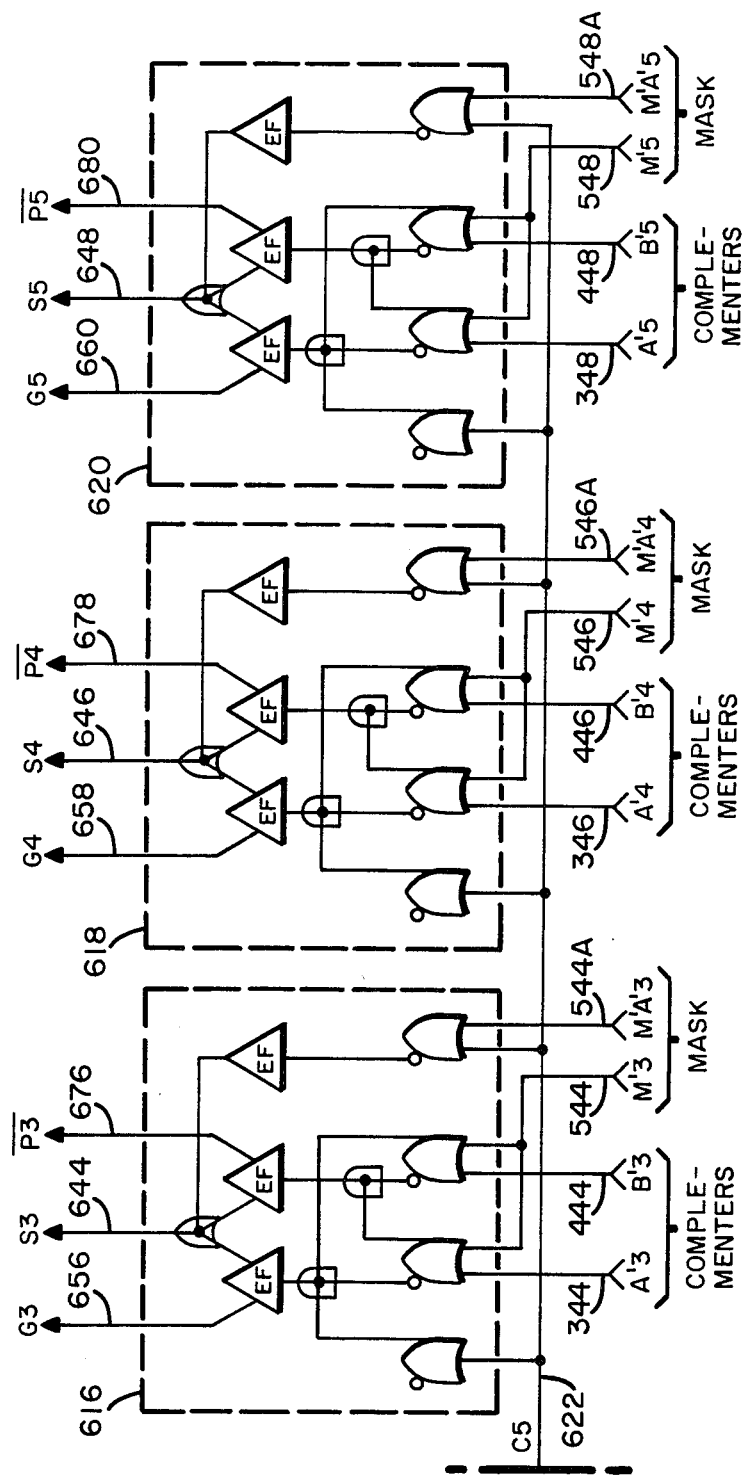

FIG. 6 includes FIG. 6A and FIG. 6B positioned as shown. It comprises six identical sections 610–620 so only one 610 will be described. The C5 control signal 622 is applied to a pair of OR gates 601 and 604, while the A'0 and B'0 complementers 338, 438 respectively are applied to a second pair of OR gates 602, 603 respectively. This control signal C5 again originates at the command register and mode control selection unit 1100 of FIG. 2 and it operates in conjunction with the half adder of FIG. 6 to modify the configuration from an exclusive OR gate with independent half exclusive OR outputs when C5 is high. When C5 is low, the network is reconfigured to disable the half term. An M'0 mask signal 538 is commonly applied to both of this second pair of gates 602, 603. The low output of gate 602 is wired together with the high output of gate 603 and applied to emitter follower 607. The low output of gate 601 is commonly wired together with the high output of gate 602 and the low output of gate 603, which common connection is connected to the input of emitter follower 608. Each follower 607 and 608 has two output terminals. One of each of them is commonly connected together to provide the sum S0 via line 638. The other output terminal of emitter follower 608 provides the generate output G0 via line 650. The other terminal of emitter follower 607 provides the propagate signal $\overline{P0}$ along line 670.

Operation is controlled by C5, 622, which, when active high, configures this unit as an exclusive OR gate with independent half exclusive OR outputs (G0 and $\overline{P0}$). This is the normal state for the standard arithmetic operations. When C5, is active low, it serves to reconfigure the network by disabling the G0 half term and enables the M'A' term to be "OR"ed in its complement form with the sum term output. All arithmetic and logical operations are accomplished in this network utilizing various combinations from the complementer and mask inputs. These operations are detailed as follows.

Arithmetic Operations: C5 is High

In this configuration the borrow terms of $G_n$ and $\overline{P}_n$ are generated. These terms comply with the rules of one's complement subtraction when the complementer supplys the terms $A_n$ and $B_n$. The Generate term ($G_n$) is active high only when $A'_n$ is low and $B'_n$ is high. For subtraction this corresponds to the case of zero minus one. The propagate term ($\overline{P}_n$) is generated in its complemented form and is high only when $A'_n$ is high and $B'_n$ is low. This is to be interpreted as the not propagate case when a borrow into this bit position is not passed to the next higher bit position. The low state of $\overline{P}_n$ allows borrows to be passed on and is generally termed an inclusive propagate in that it includes the borrow generate case. By exercising the proper controls to the complementers it is possible to generate the functions of A−B, B−A, B+A, and −B−A as the basic arithmetic operations. The "OR"ing of $G_n$ and $\overline{P}_n$ provides the basic half add term.

Logical Operations AND and OR: C5 is Low

The basic logical operations of AND and OR are accomplished by reconfiguring the half-add into only the propagate term by disabling the generate side. The $S_n$ output then obeys the basic equation of $A'_n \overline{B}'_n$. By controlling the complementers all the various permutations of A, A, 0,1; B, $\overline{B}$, 0, and 1 are possible. The output is passed to the full-add section where it is passed unchanged or complemented.

Masked Comparison: C5 is High and Mask Control C4 is Low

The masked comparison operation is accomplished by setting the ALU in a subtract mode via the complementers and enabling the mask input via C4. This supplies the mask value in complement form to the bit network and forces the not generate, force propagate case wherever the mask value is a zero. Masked comparison is achieved by the basic equation of $A \cdot \overline{M} - B \cdot M$ and monitoring the borrow and propagate term of the overall ALU. Equality is detected by all stages in a propagate state; no borrows being generated. The magnitude of B greater than A is detected by the existence of an end around borrow. Algebraic B greater than A is detected by signs alike and end around borrow or signs unlike and no end around borrow.

Masked Substitute: C5 is Low and Mask Control C4 is Low

The general equation to be satisfied by this function is $A \cdot \overline{M} + B \cdot M$. This is accomplished by setting the complementers to produce the terms $A'_n = 1$ and $B'_n = B$ and selecting the mask input function. The modified half add function then supplies the partial function of $B \cdot M$ while the mask function $M'A'_n$ supplies the term $A \cdot M$ which is "OR"ed with $S_n$ satisfying the equation.

Figure 7:
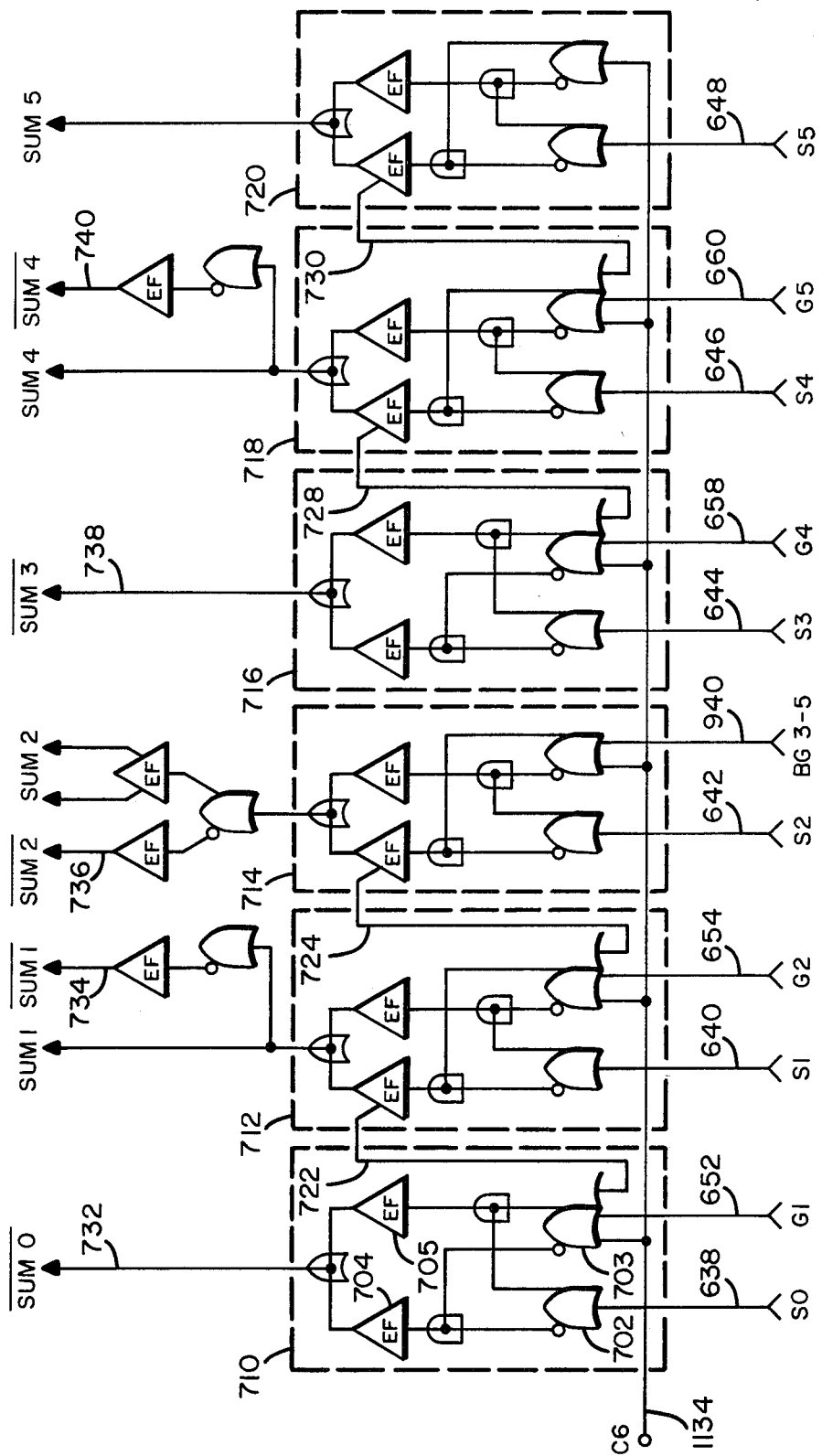
FIG. 7 logically illustrates the intrastage borrow and full-adder of the ALU.

FIG. 7 presents the logical diagram for the intrastage borrow and full adder network. This network combines the sum, borrow generate, and borrow propagate networks to produce the difference (or sum) of the selected operands. FIG. 7 illustrates this operation for six-bit ALU. Each bit combines the sum terms with the borrow or ripple borrow from a previous stage and present its output in complement form to the output section and minus one networks. The individual bits are made up of coincidence gates producing the coincidence of sum and borrow input terms. A control line (C6) is provided to force the intrepretation of borrow into all stages which are active for complementing logical operations. This also effectively ignores the state of all borrow terms when high.

Looking at a single bit section 710 of the six sections 710-720, the sum term S0 is combined with the borrow term G1 or the ripple borrow term received from the previous stage 712. This ripple borrow term arrives via line 722 into gate 703. The complement $\overline{SUMO}$ output sum is produced on line 732 as a result of this combining in gates 702, 703.

Figure 8:
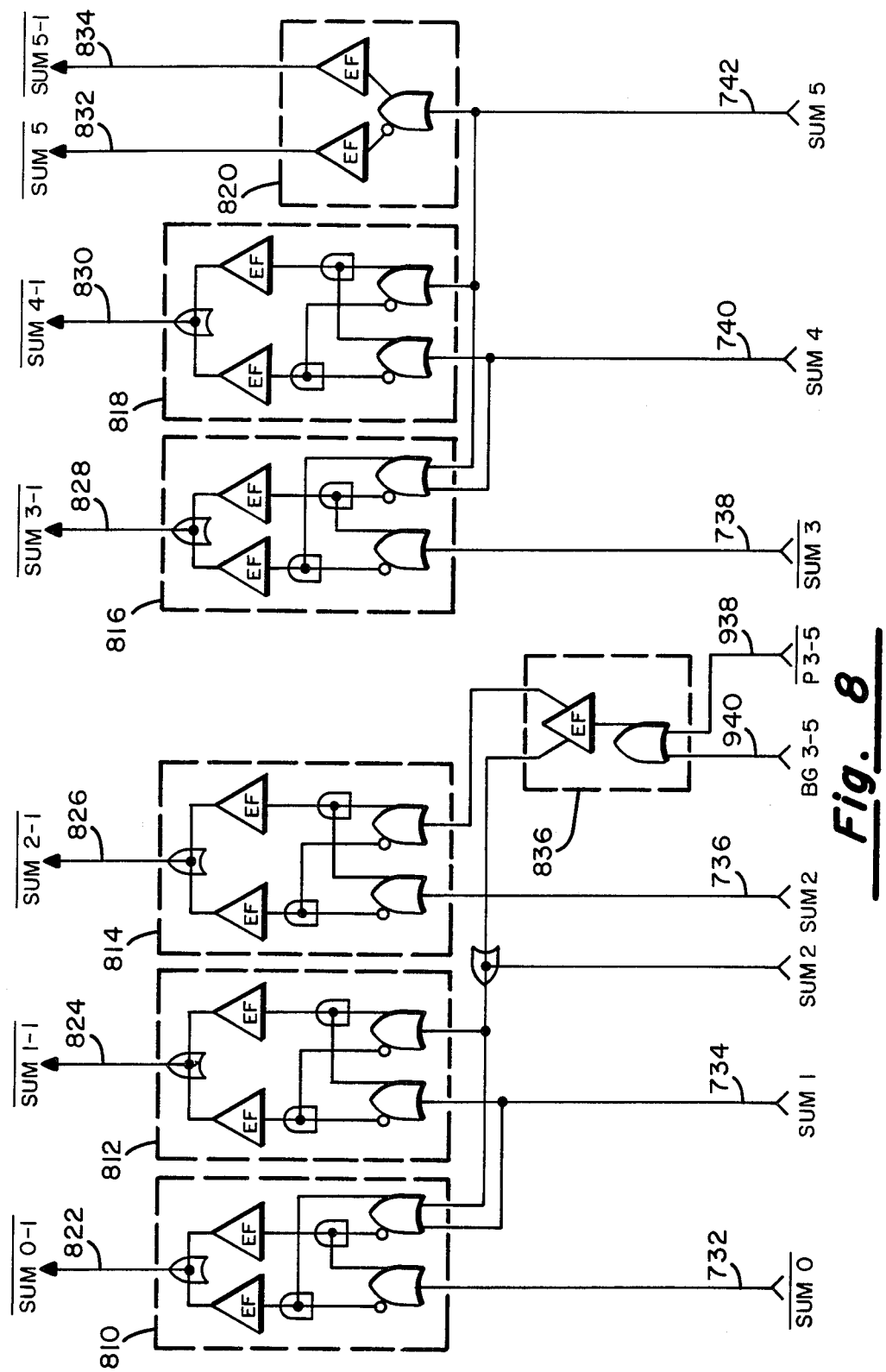
FIG. 8 is a logical diagram of the minus one network of the present invention.

FIG. 8 illustrates the minus one network which receives the sum output and subtracts one from it and presents this reduced sum to the output selection network for final result production. This minus-one network is included to provide a system speedup of the arithmetic logic unit performance by minimizing the delay associated with group borrow input to final output sum. The least significant stage merely requires complementing. The middle stage is complemented if the lowest stage is a zero (high) and the upper stage if both lower stages are zeros (high). This is accomplished in basic exclusive OR gates. Thus, there are a plurality of five exclusive OR gates 810-818. They receive the sum outputs 732, 734, 736, 738, 740 and 742 and subtract one from each sum S0 to S5. The least significant stage 820 is not an exclusive OR gate since that bit merely requires complementing by logic complementer 836. The six output signal sums, $\overline{S0-1}$, $\overline{S1-1}$, $\overline{S2-1}$, $\overline{S3-1}$, $\overline{S4-1}$ and $\overline{S5-1}$ appear on lines 822, 824, 826, 828, 830 and 834 for presentation to the borrow input/output selector of FIG. 10.

Figure 9:
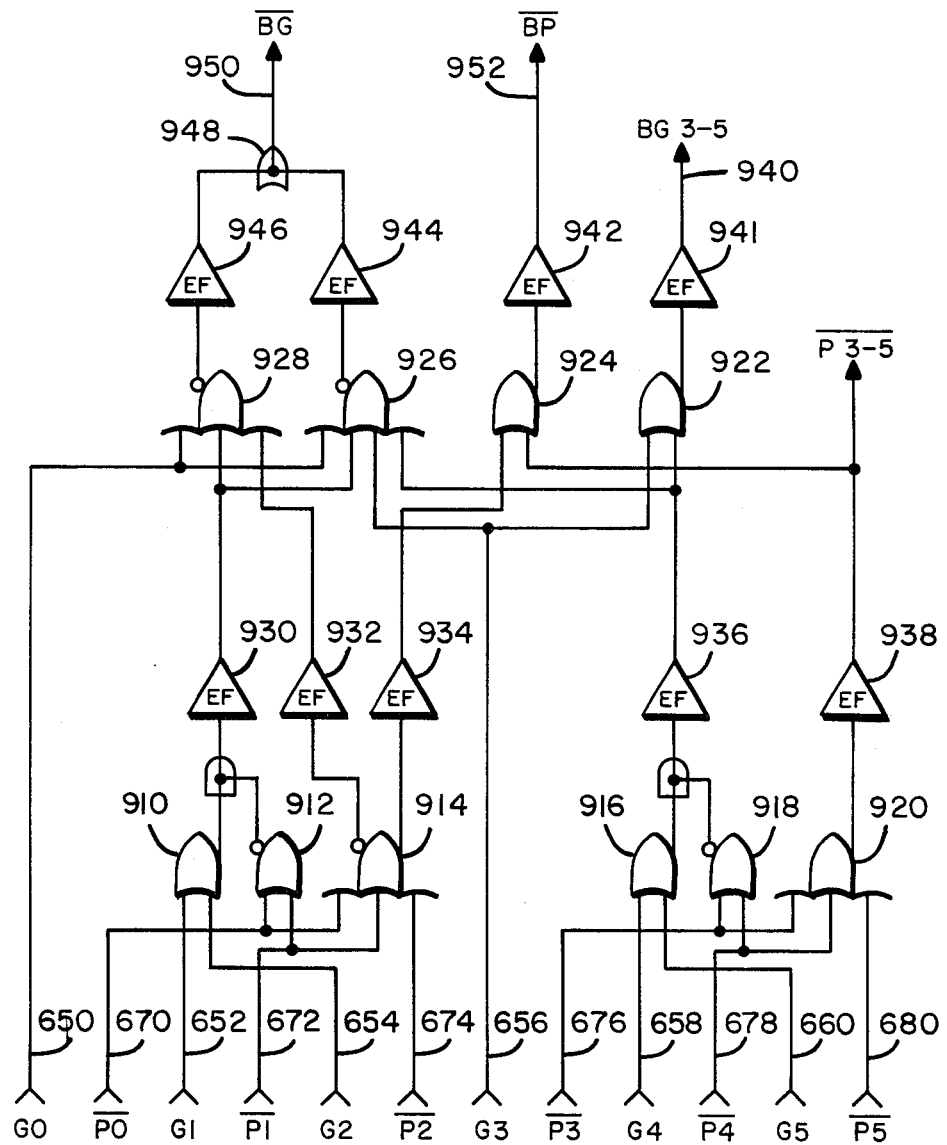
FIG. 9 is a logical representation of the group generate and propagate circuits of the invention.

FIG. 9 is the group borrow and propagate logical network. Generally, it is merely a combining network. It first combines G1 and G2 via gate 910. Next, $\overline{P0}$, $\overline{P1}$, and $\overline{P2}$ are combined via gates 912 and 914. At the same time borrow signals G4 and G5 are grouped into gate 916 as are propagate signals $\overline{P3}$, $\overline{P4}$ and $\overline{P5}$ combined by gates 918 and 920. These first stage or lower level signals are passed through emitter followers 930, 932, 934, 936 and 938 and sent to a second level or stage for further combining by gates 922, 924, 926 and 928. Thereafter they are sent to a further set of emitter followers 941, 942, 944 and 946 to provide the $\overline{BG}$ and $\overline{BP}$ output signals on lines 950 and 952. This may be stated more succinctly by saying that this network combines the individual bit generates and propagates into three-bit subgroups, then further combines these into an overall six-bit generate and propagate term for application to an intergroup borrow lookahead network. The basic equation for a three-bit group is $G0 + (G1 + G2)(P0P1)$ which because of the inclusive propagate may be reduced to $G0 + G1P0 + G2P0P1$. The $\overline{BG}$ and e,ovs/BP/ terms are sent to a borrow lookahead network where they are combined with other groups and transmitted back to the individual adders as borrow inputs ($\overline{BIN}$).

Figure 10:
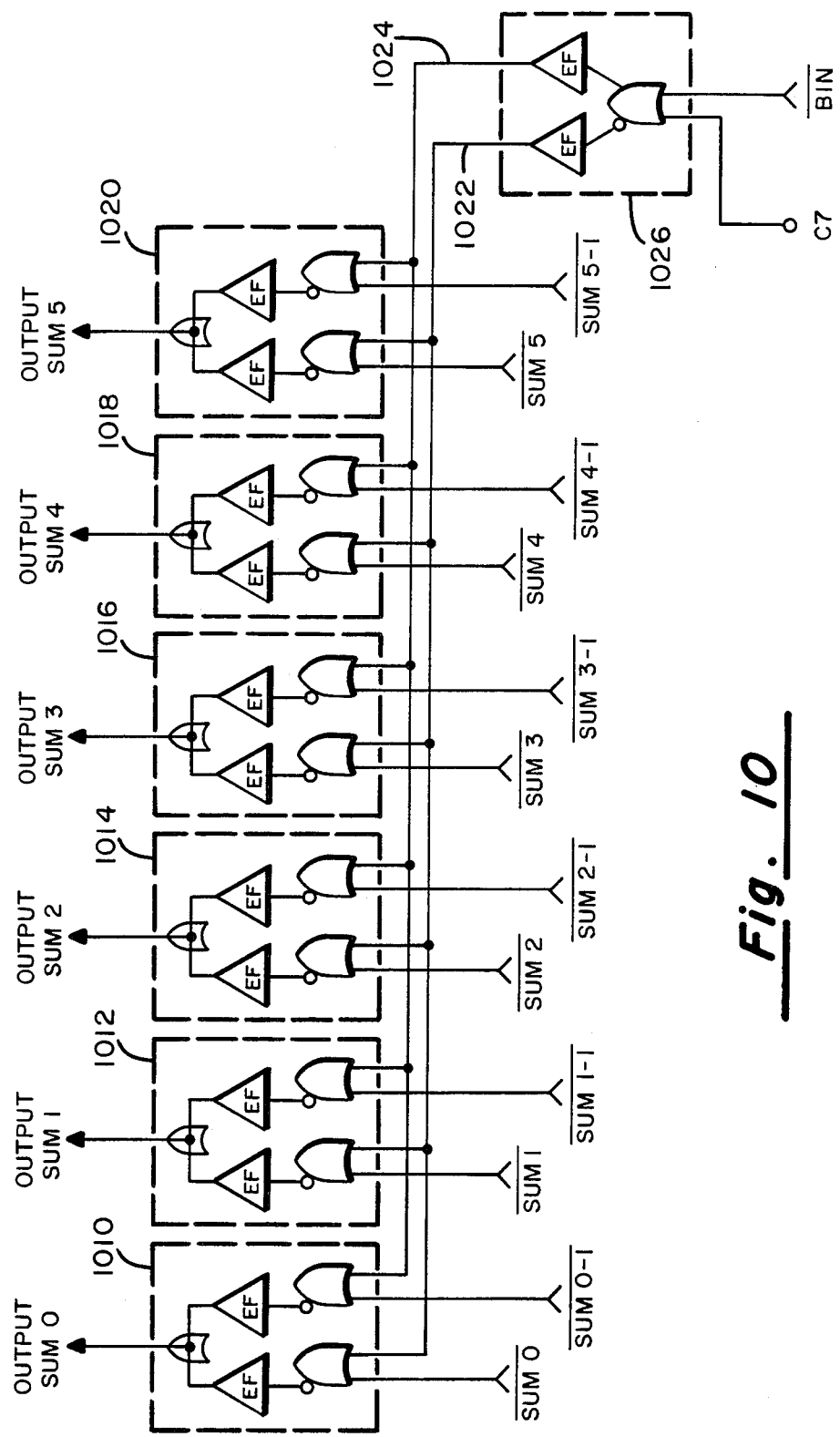
FIG. 10 is a logical diagram of the borrow input and the output signal selection.

FIG. 10 is merely a plurality of six gating circuits 1010, 1012, 1014, 1016, 1018 and 1020 through which the outputs from one full adder or the minus 1 networks are selectively gated. It is seen therefore that the output SUMO from gate 1010 may be either the complement of $\overline{SUMO}$ arriving along line 1022 or the complement of $\overline{SUMO-1}$ arriving along line 1024 depending upon the output from selection gate 1026. This section thus utilizes a borrow input signal $\overline{BIN}$ to selectively gate the sum output or minus one output of the ALU. It is generally understood that control signal C7 is used to block the borrow input signal when the ALU is used to perform boolean functions.

Figure 11:
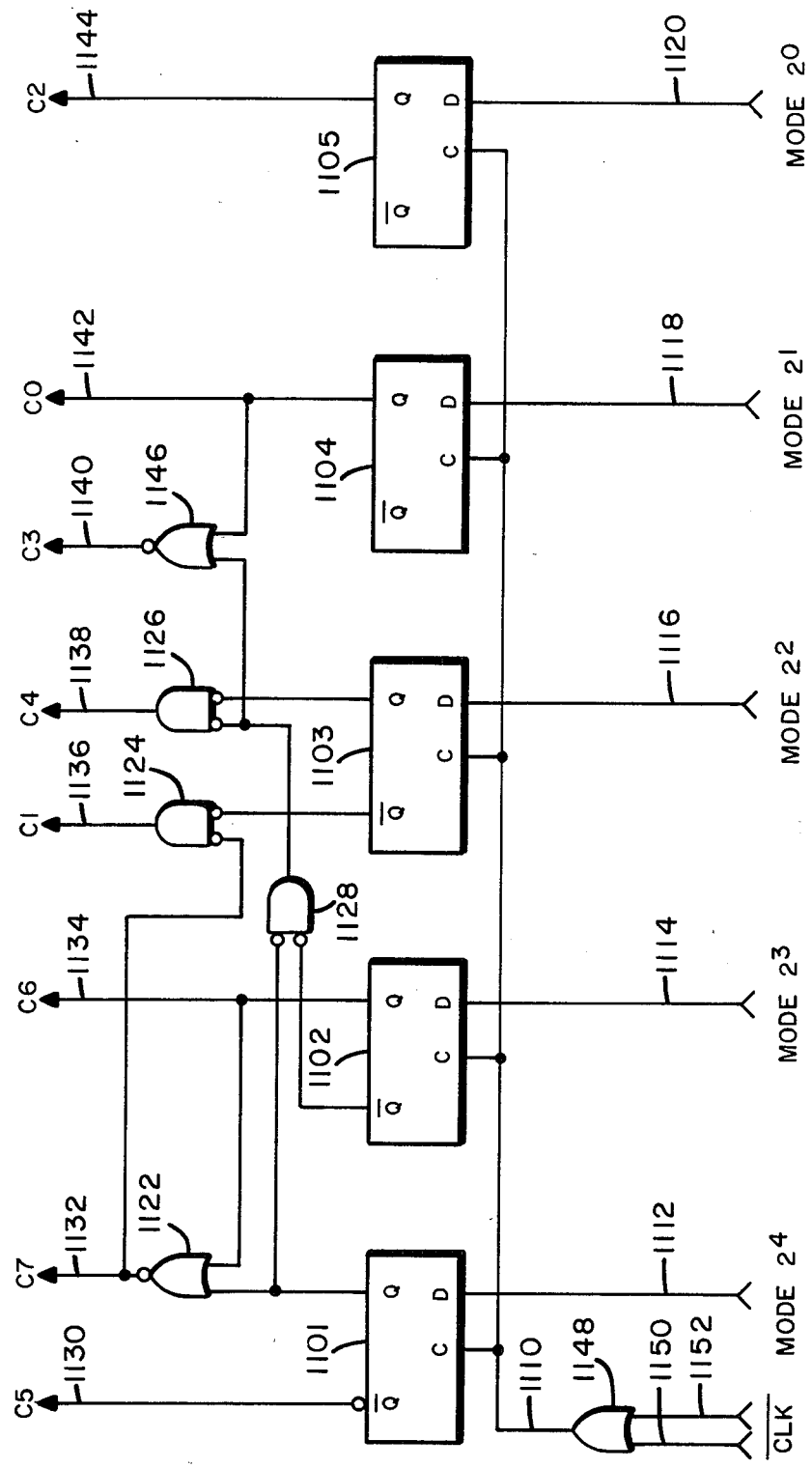
FIG. 11 is a logical circuit diagram of the command register of the present arithmetic unit.
Figure 13A:
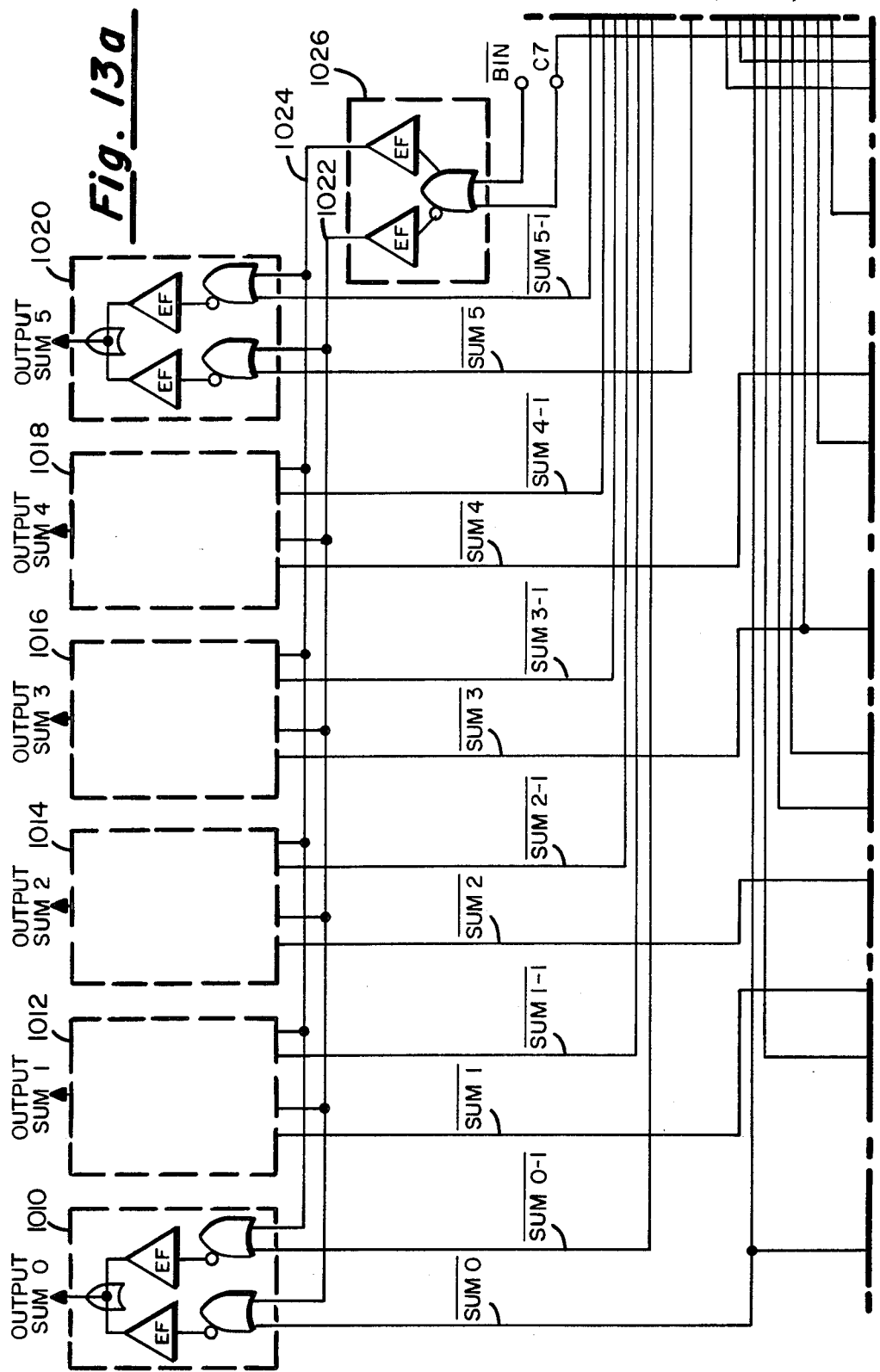
Figure 13B:
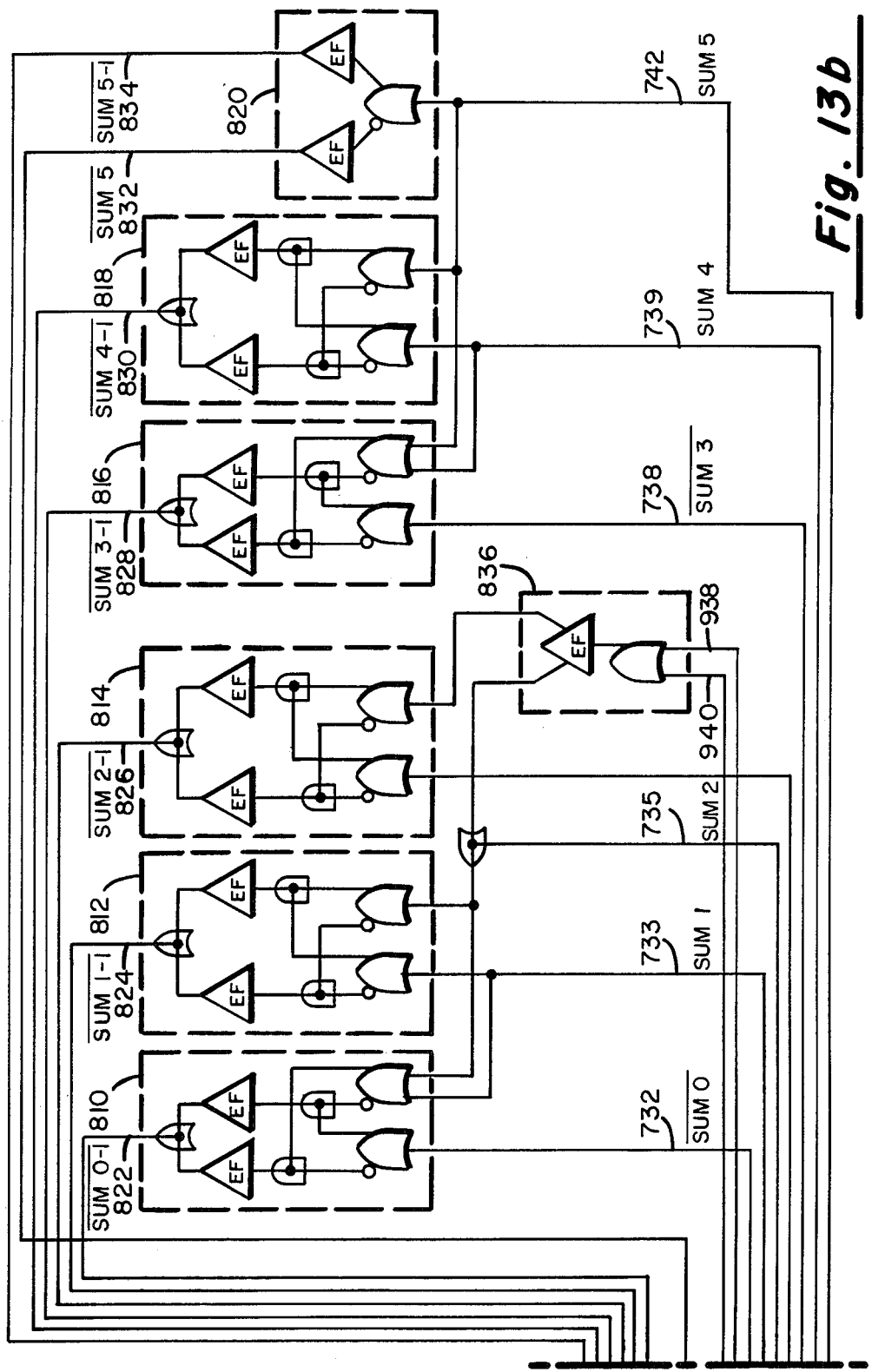
Figure 13C:
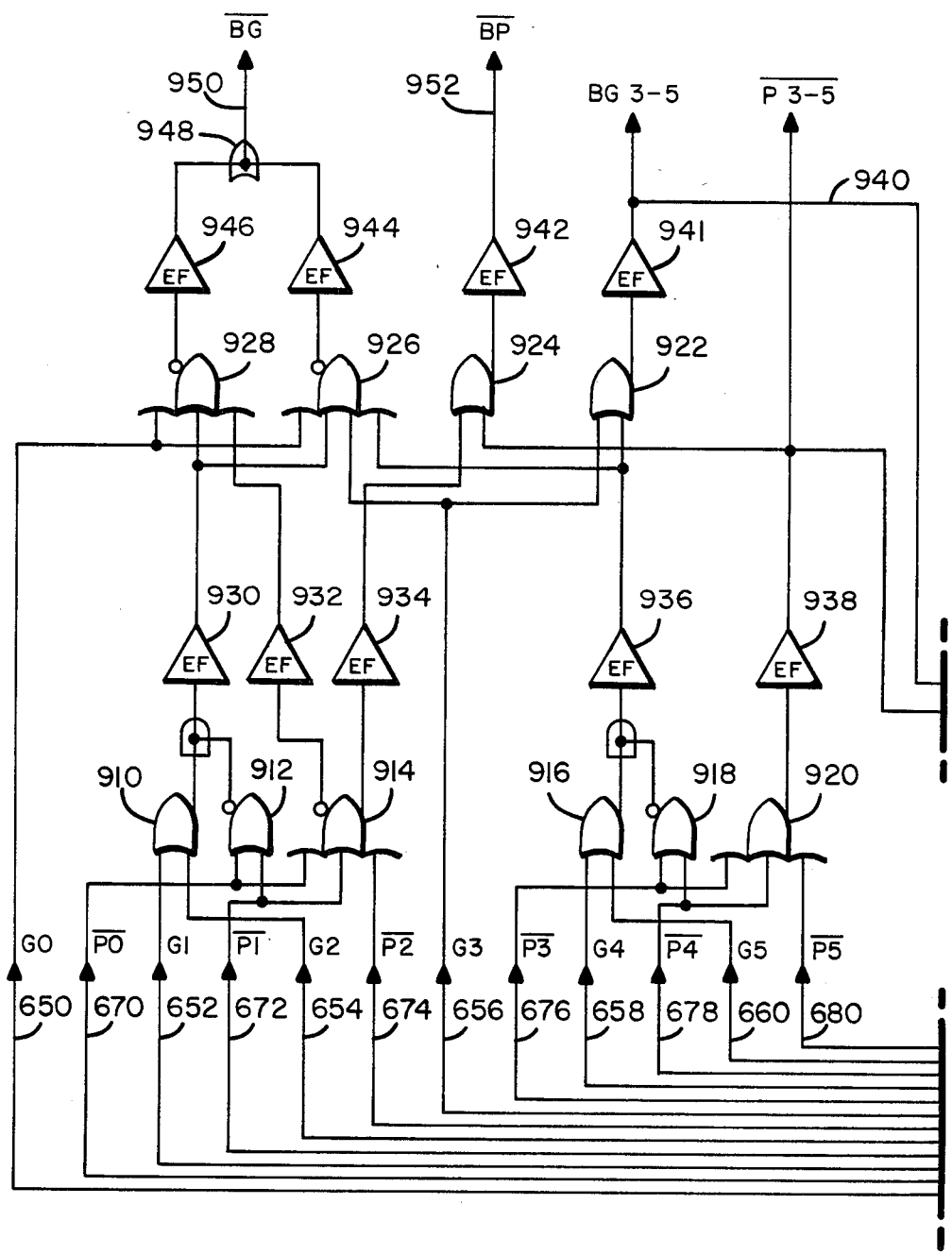
Figure 13D:
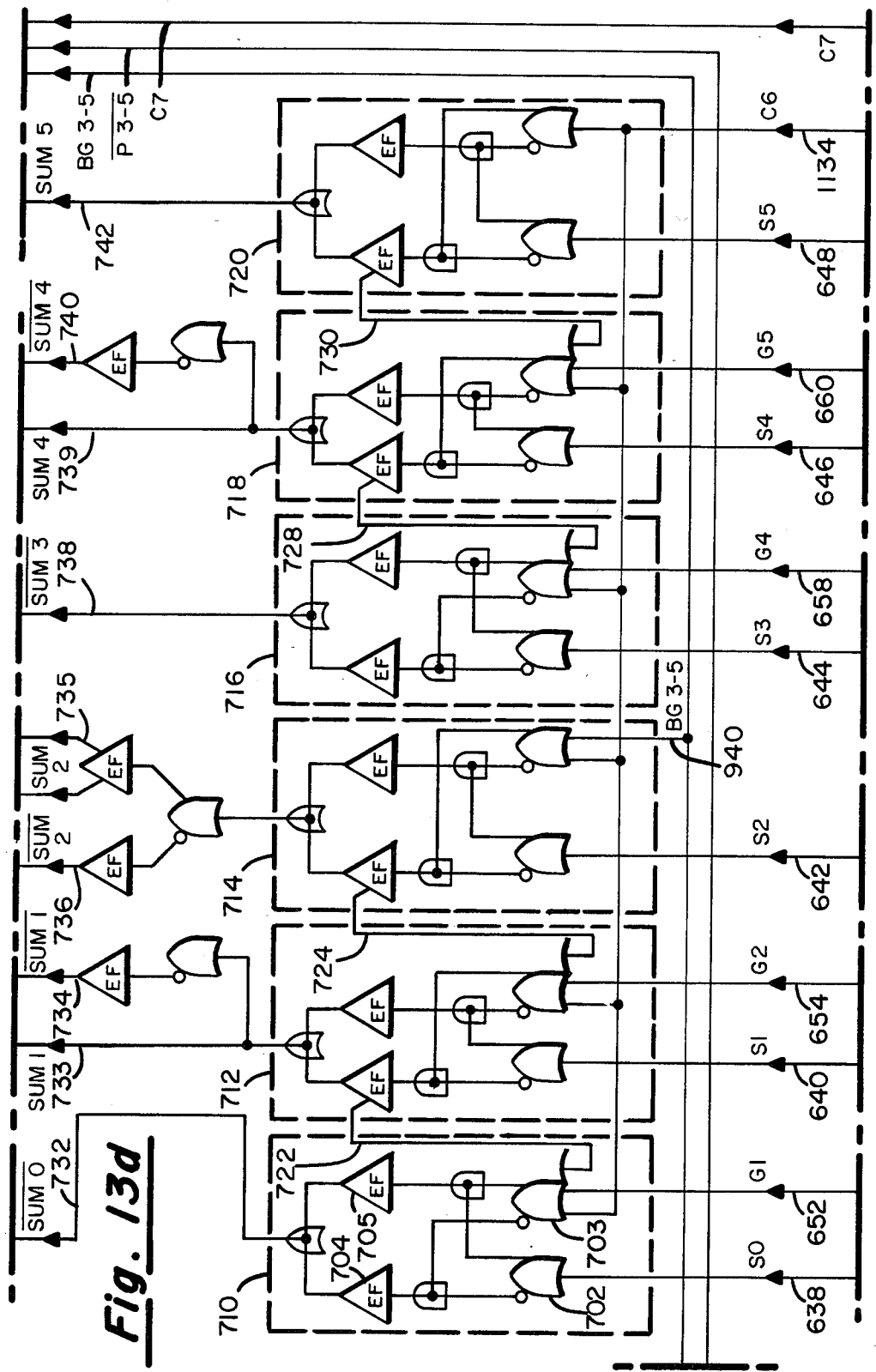
Figure 13E:
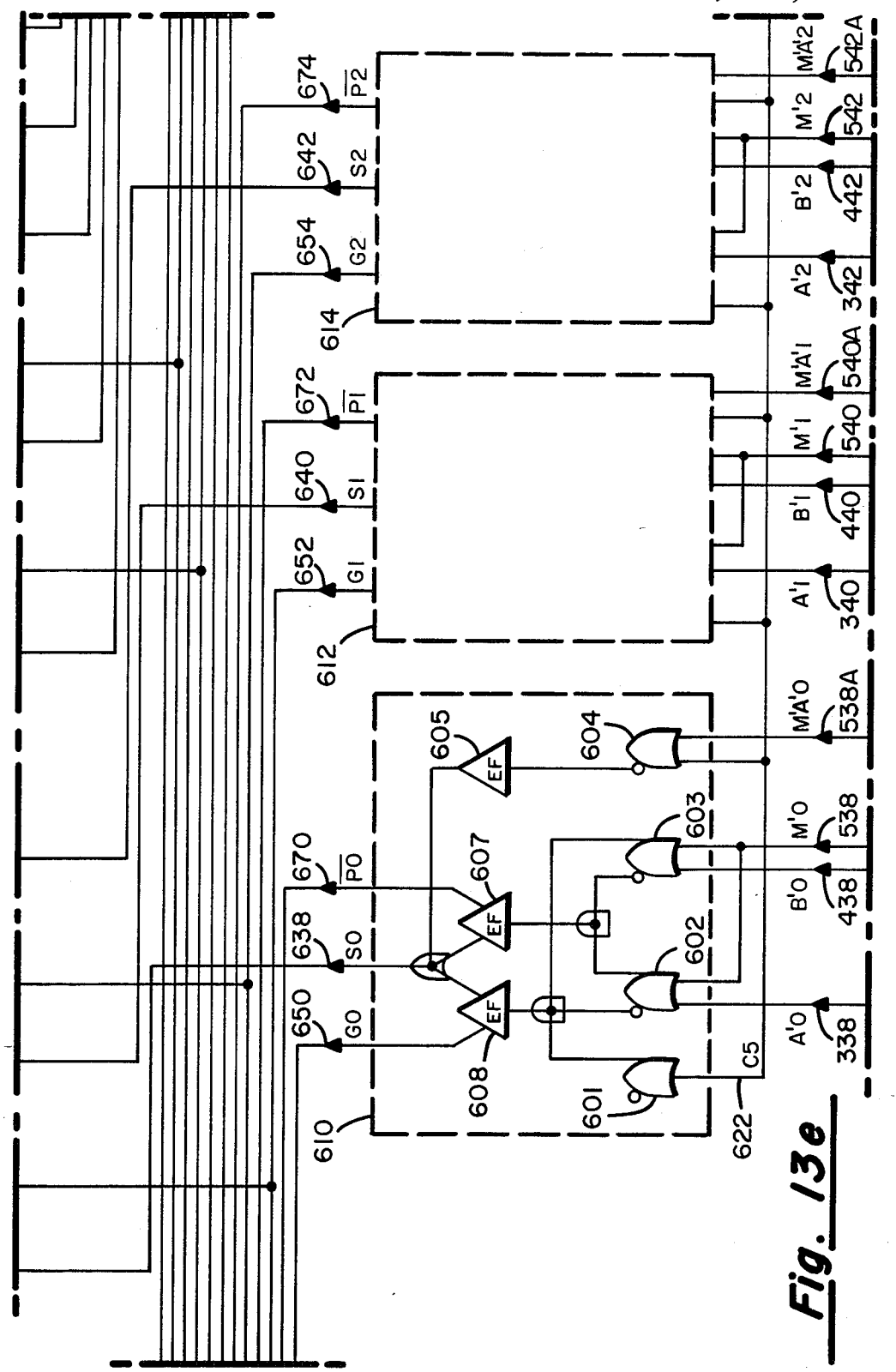
Figure 13F:
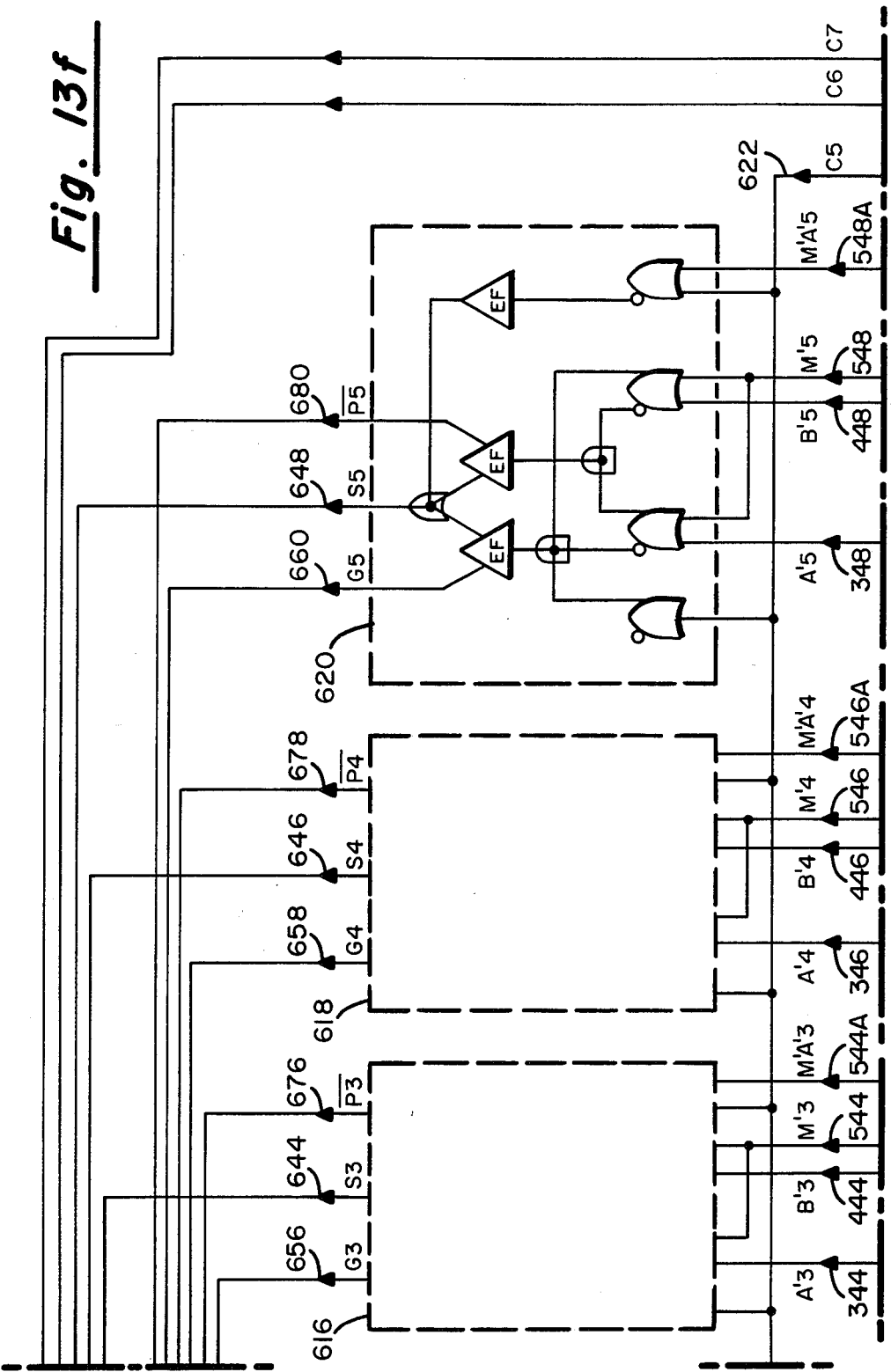
Figure 13G:
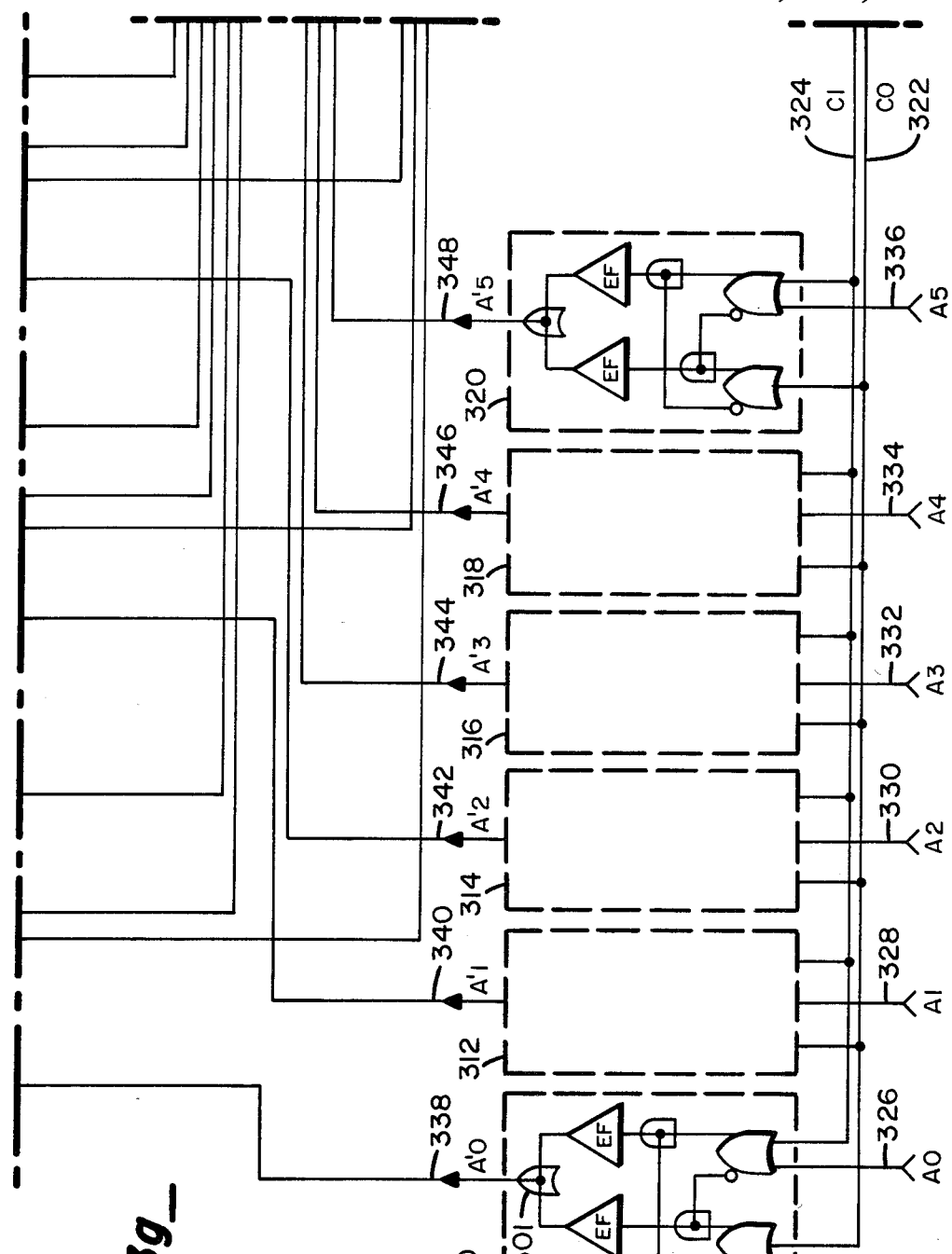
Figure 13H:
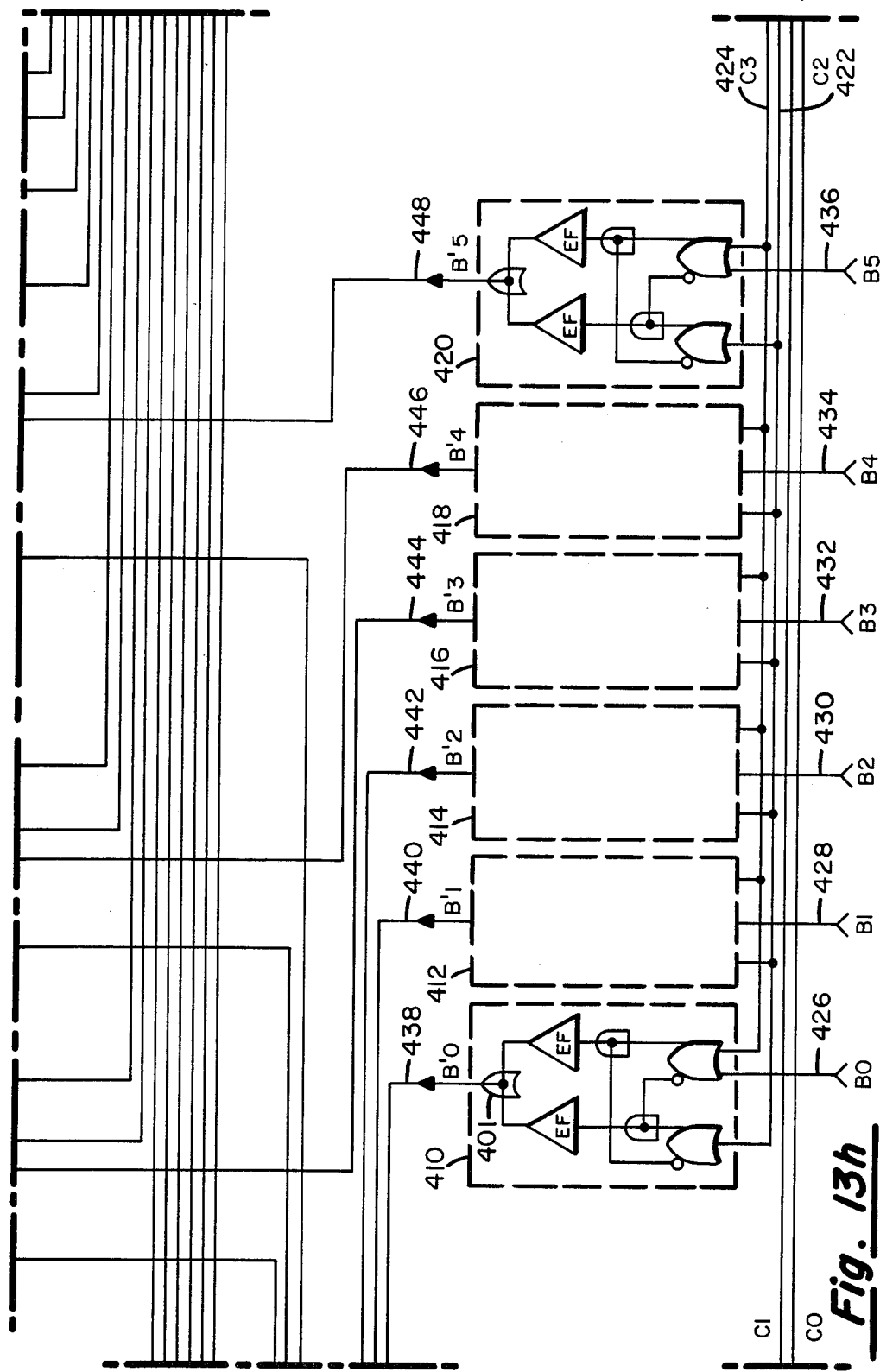
Figure 13I:
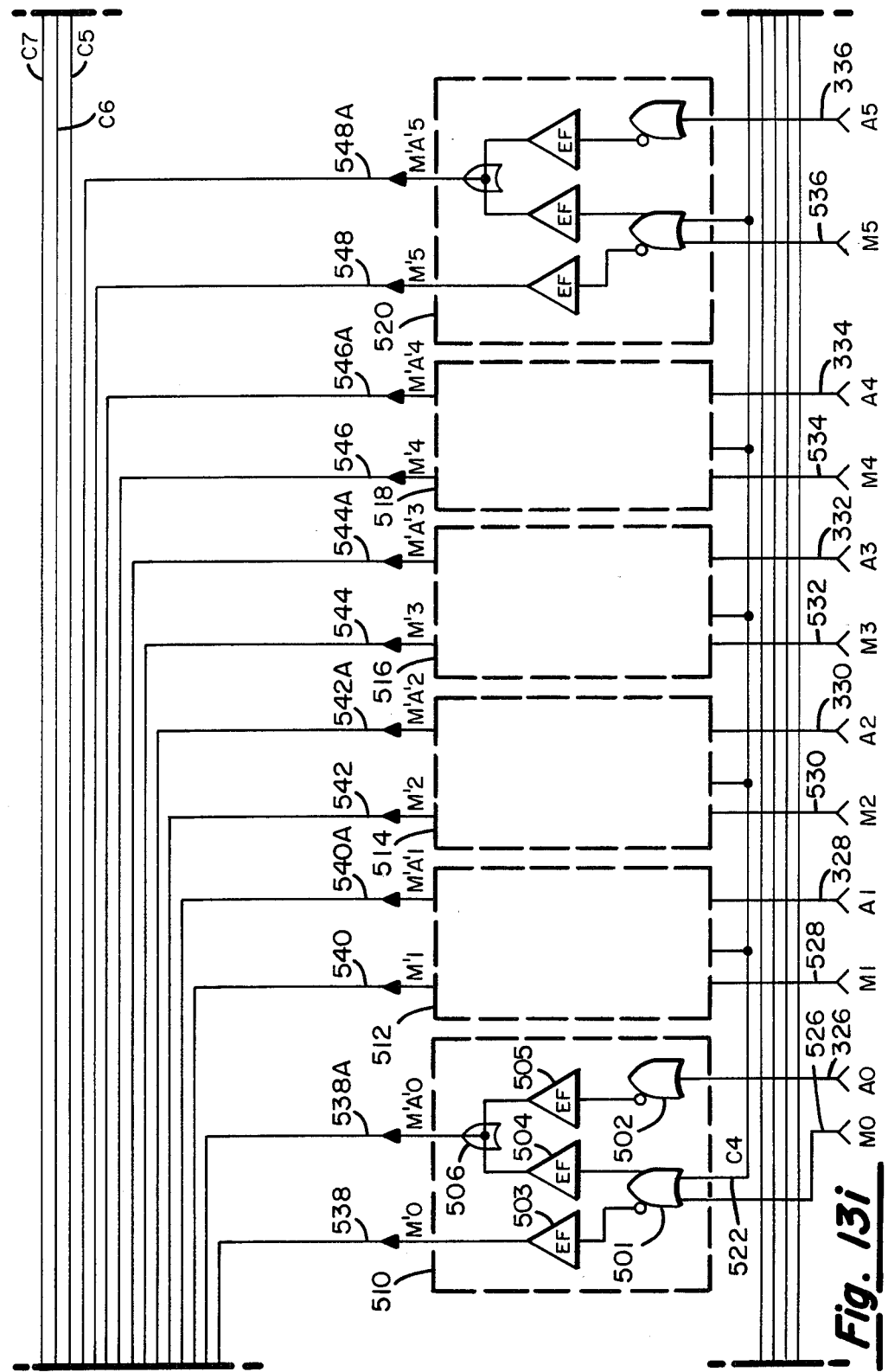
Figure 13J:
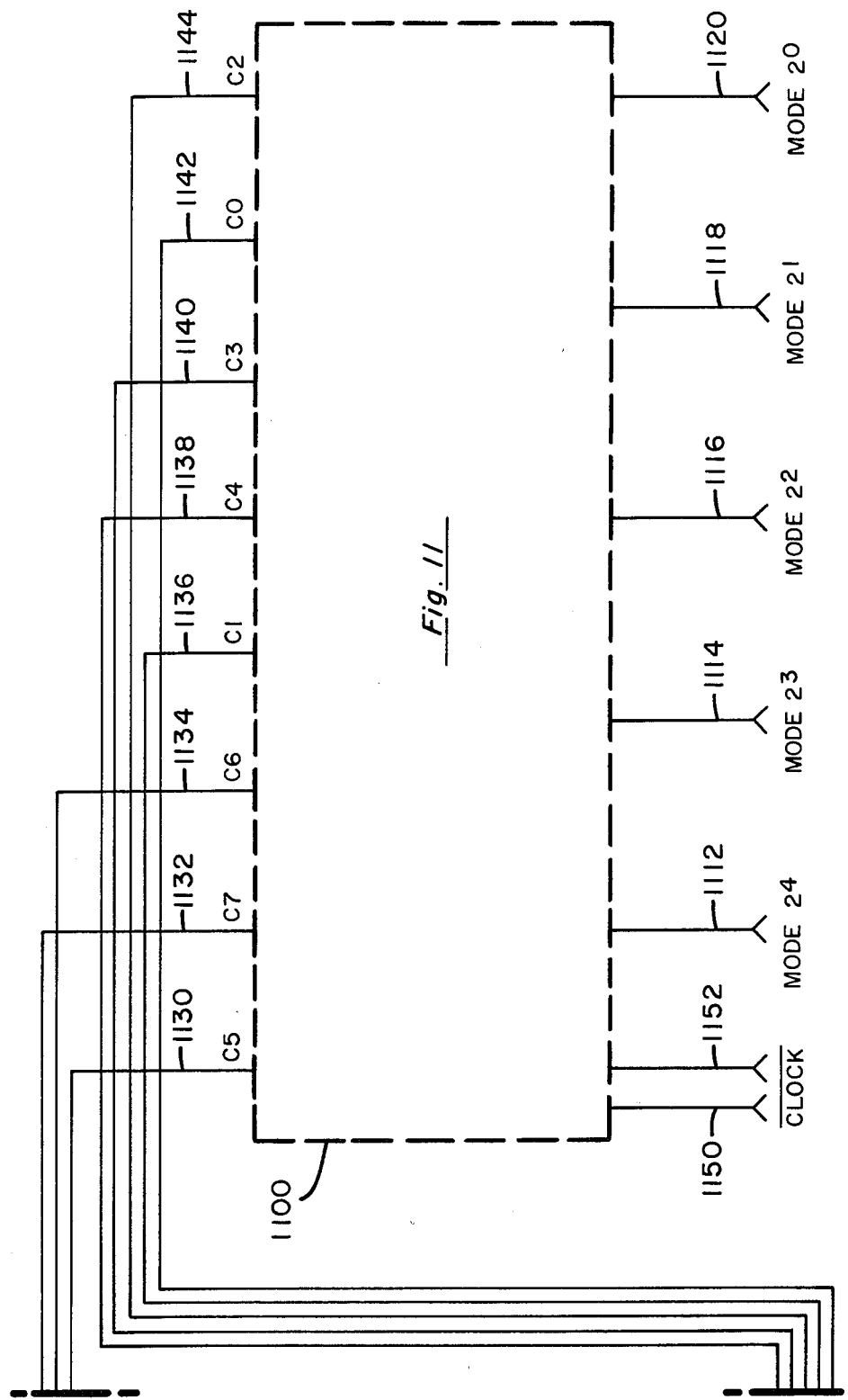

FIG. 11 logically illustrates the mode control section of the ALU. A plurality of input mode signals $2^0$, $2^1$, $2^2$, $2^3$, $2^4$, arrive along input lines 1112, 1114, 1116, 1118, and 1120 to a plurality of latching circuits 1101, 1102, 1103, 1104, 1105. These latching circuits will not be further explained except to say that they are well known in the circuit art and are commonly called flip-flops. However, this connotation is slightly inaccurate since they do not operate in exactly the same way. That is, a flip-flop operates on clock edges whereas a latch operates on the entire clock pulse. In any event, these are conventional circuits and no further explanation is deemed necessary. The clock terminals of the latches 1101, 1102, 1103, 1104 and 1105 are commonly activated by clock signals along line 1110. The phased input clock signals 1150 and 1152 are gated through gate 1148 to provide this common clock signal. Thus, the ALU mode control which is exercised in this section, incorporates a five-bit latching register to capture the desired command function and generate the basic mode controls C0, C1, C2, C3, C4, C5, C6 and C7 along output lines 1130, 1132, 1134, 1136, 1138, 1140, 1142 and 1144 to the various ALU sections. By latching these lines on the same clock phase 1150 or 1152 as the data registers driving the ALU, the decode and selection time is effectively camouflaged in the time associated with interconnect delays from the data registers to the ALU, thereby preserving the speed of the ALU.

FIG. 12 illustrates the table of functions provided by the ALU of FIG. 1. It is believed obvious from this table that this arithmetic logic unit provides the encoding selection by one unit's function of its five-bit input command. The status of each output control signal C0, C1, C2, C3, C4, C5, C6 and C7 is indicated in the table for each octal input mode signal 00 through 37.

Figure 13:
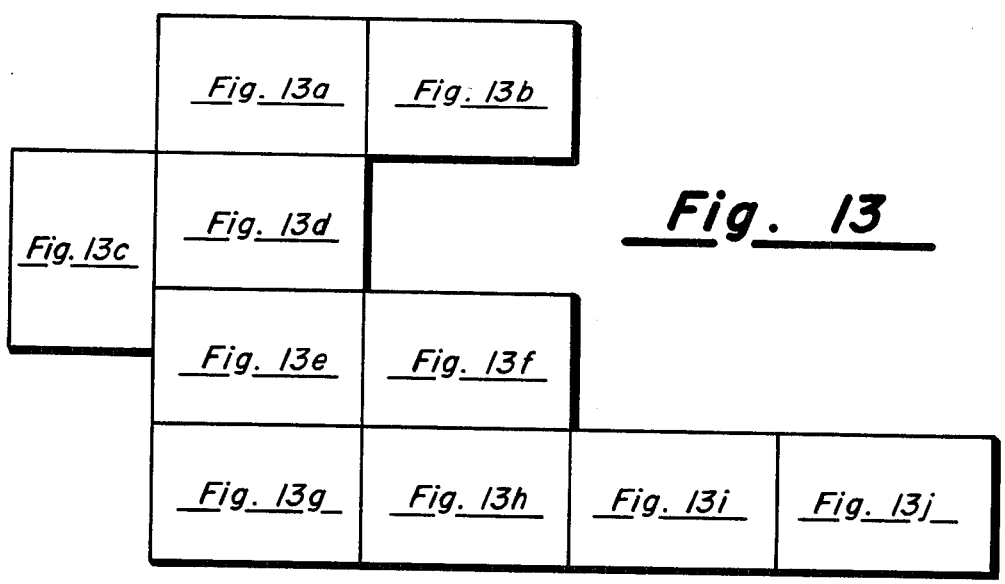
FIG. 13, includes FIG. 13A through FIG. 13J positioned as shown, and illustrates a complete composite logic diagram of the entire arithmetic unit showing the interconnection of the various networks.

FIG. 13 comprises FIGS. 13A-13J which is an overall system logical drawing of the entire ALU unit. It readily illustrates the interconnection of each of the separate sections heretofore illustrated and explained. It is comprised of the detailed drawings of each of the blocks shown in FIG. 2 and generally positioned in the same manner.

The basic adder is controlled by a five-bit code C0, C2, C4, C5, and C6. The control signal C7 operates selective control upon the output sum multiplexer comprised of gates 1010-1020 shown at the top of this figure. The control code is provided by the five latches 1101-1105 shown on the right hand side above the masking portion of the figure. The C connotation refers to the control feature of these lines. That is, they controllably select a particular mode. They are connected to the adder at various points to control the operation of the data as it flows through the adder. As the data enters the system at the bottom of the figure, it is the data itself which is labelled in A and B terms.

The data signals are labelled as A0 through A5 and B0 through B5 and show only a six-bit segment of the adder for purposes of explanation. Now these terms come through a series of logic gates 310-320 for the A input and 410-420 for the B input. These sections are called the complementer portion. These are the A and B operands that are combined in the add and subtract modes, as well as various other logical modes, that are provided in the ALU.

There is a third set of input signals, called herein M0 to M5, which is the third operand into the adder. This is the mask operand. It is entered through gates 510-520 and these are the bit positions corresponding to the data positions. It is the function of the mask operand to define which bits are to participate in the particular logic operation that is to occur. The A and B complementers therefore not only operate under the selection control of contol signals C0-C7 but also may have particular bit positions masked or blocked by mask signals M0-M7. In the lower left hand corner of the figure A and B data is entered into the exclusive OR gates 310-320 and the exclusive OR gates 410-420 respectively. The A terms are controlled by control signals C0 and C1 while the B terms are under the control of control signals C2 and C3. Since these are exclusive OR terms they generate the exclusive OR of the data as it comes through under the control of C0 in this case. The C1 term is merely OR'd together with the data such that we can force the data to appear as all ones. So if C1 is active (1), it really OR's together with the A terms and causes these terms to appear as ones when they enter the complementer. Therefore, the functions that you can get out of the complementer are the A term, the A term complemented, by means of controlling the S0 line, or you can get all ones through or the complement of all ones which, of course, is all zeroes by controlling C0 and C1 together. We have a very similar situation with the B terms which are shown to the right of the A terms. In this particular case, we have a situation which is identical to that found in the six A terms. It is merely applied to the B terms using two analogous control functions C2 and C3 that C0 and C1 controls accomplished with the A terms.

The third portion of the front end logic is concerned with the mask terms and these are to the right of the B terms. Here, we are bringing in the mask terms which are M0 through M5 as well as the A terms, A0 to A5. Basically this is made up of two areas of logic. Notice that the M bits M0 through M5 are being OR'd together with the C4 terms. If C4 is high then the mask is not being used in this particular operation and it merely overrides the M terms in the OR circuit such that the complemented output is always going to be low if the C4 term is high. If the C4 term is low, then it allows the mask bit to come through. Depending upon whether the mask is a one or a zero will control the output coming out of the complemented output of the OR circuit shown. The other portion of the logic uses an emitter OR tie 506 to combine the output of the mask and C4 with the A terms coming through the adder, such that we get a logical ORing of the complement of the A term. Notice also that it is coming through the complements side 501 with the OR function of C4 or M0 such that if either C4 is high or M0 is high, the output node of the emitter tie 506 is going to be high as well. It will only be low on this term when C4 is low and M0 is low and A0 is high. That is the only case that will generate a low output out of that gate. That is called the M'A' term. On a bit position basis, these terms are called M'A'0 through M'A'5.

Now these input lines which are coming into the arithmetic unit i.e., the A, the B and the mask terms, all come through this first level of logic before they are applied to the first-half add stage. The first-half add stage is immediately above the complement stage, and is comprised of four gates per stage, 601, 602, 603 and 604. The center two gates per stage 602, 603 are connected into an exclusive OR combination. Whereas, the other two gates 601, 604 are applied for controlling how this half-add will work. It is at this stage that we generate the half-add sum terms which are labelled at the outputs as S0 through S5. These are referring to the sum terms and they are basically the exclusive OR of the A and B terms coming through when the operation is not being masked. That is, the mask lines are inactive. Also generated out of this stage are what we call the borrow generate terms which are labelled G0 through G5 and the propagate terms which are labelled as $\overline{P0}$ through $\overline{P5}$. The bar over the P indicates that they are active low. That is when the stage cannot satisfy or borrow, these terms are low. The generate terms when the stage is generating a borrow is an active high output and the sum terms are also an active high output. That is, they are high when the exclusive OR of the two numbers being applied is a one.

Now the combination of this first half-add stage 610-620 with the input logic as it comes through, since the data being presented to the half-adder can be applied at either its true or complement form by the front end complementers of the logic, allows us to generate both the add and subtract terms as they come through the first half-add stage. This is accomplished merely by complementing the data and since the data can be complemented on either the A or the B term we can get all permutations of add and subtract. That is, A−B, B−A, A+B and the complement of A plus the complement of B. All four permuations of add also can be accomplished in combination between the front end complementers and the half-add stage.

Next the output of first half-add stage is applied into two places. The sum terms go into what we shall call the second half-adder stage which is a ripple carrying network 710-720. The sum terms are brought up into this stage as the sum terms S0-S5. The basic segment 710 is an exclusive OR configuration comprising gates 702-705. This is similar to the configuration that we had in front end complementers with one little difference. As before, we come through and generate the exclusive OR of the borrow terms being brought in and the sum terms coming in from the first half-add stage and the exclusive OR function is brought out through the emitter dot. However, note that one of the emitter followers also supplies an independent output 722, 724, 726, 728 and 730. This will be high in the event that the sum is zero, and we had a borrowed input from a previous stage. This is then presented to the next higher order. Before leaving this adder explanation, it should be noted that if we have a borrow we will complement the sum term as it comes out. A borrow will be generated if the sum term were zero in this case. This would be reflected out of the emitter follower of the SUM 5 term as a high, following over via 730 into the SUM 4 term 718. This then is emitter dotted via 728 with the generate term 656 coming out of the first half-add stage. This generate term is emitter OR'd with the borrow term, and then is applied as the borrow input to the SUM 3 term where we do the same operation as we did in the SUM 4 term. This sequence continues until we arrive at the SUM 0 term and complete the ripple borrow operation.

Essentially what we have here is the second half-add stage, which is shown as six half-adders. These are exclusively OR'd together where we have the inputs coming from the first half-add stage in terms of sum terms. Also arriving here are the borrowed generate signals. In the case of a six-bit group we have individual stage borrows, shown as G0–G5 coming into the half-add stages. The resultant output of this section is the final sum of this six-bit group. The other place that the first half-adder goes is shown on the extreme left hand of the drawing. This is where the borrows from the six-bit group are combined together with the propagate terms to generate an overall borrow output and an overall propagate output term, based on a six-bit group. This is a six-bit borrow generate and a six-bit borrow propagate term whose output levels are active when low. These, then are used to combine multiple sections of six-bit groups together into an overall adder structure that can be modular. In the case in point we build up a 72 bit arithmetic section out of the six-bit pieces, using the borrowed and propagate terms to complete the borrow lookahead operation.

Let us now consider the main adder 700 operation. Here, we said that the second half-add level combined all of the terms together to produce a complete sum output. This includes a six-bit group. However, we still have not accounted for connecting multiple chips together into an overall larger adder network. For this purpose there is a borrow lookahead network that combines the chips together and produces borrow inputs to the chips as they are to produce the final sum. Now this borrow input is a further subtraction from the overall sum that we have just described. This is shown at the top of the drawing. We see that we have a logic mode control labelled C7 and a borrow input $\overline{\text{Bin}}$ which is coming into the circuit being combined with an OR gate 1026 which then drives what we call a minus-one network. If we have a borrow input to this group we will substract one from the overall six bits sum and all six output sums are shown. This is a selection network where we select either the sum terms, as they came out of adder network, or the sum term minus-one as it is generated by the minus-one network 822–834.

The output selection device is really an output multiplexer. A two way multiplexer is shown here where the data is either the sum data generated by the adder or the sum data minus one. This data is multiplexed together under the control of the borrow input terms. The sum adder circuit drives this multiplexer and also drives the minus-one network. This minus-one network is shown at the top right side of the FIG. 13. The sum terms are brought into a series of exclusive OR's 810–820 and they are combined together in a minus-one network where the sum is generated minus-one 822–834. Thus, we have the output of the basic half-adder applied in a subtract one operation. It comes out as the sum minus-one where it is then multiplexed together with the sum output under the control of whether we have a borrow input to the group or not.

By doing things this way we can essentially mask the delay time of the borrow lookahead network while we are actually doing the minus-one operation. This is rather significant when you are trying to build high performance in arithmetic sections. While the borrows which are leaving the particular six-bit groups are being combined and fed back into the network we are in the process of actually forming up the sum minus one. While this takes a few extra gates, it is actually a faster method of doing addition.

In summary, a new six-bit arithmetic logic unit is disclosed which combines the normal basic functions of add, subtract, AND, OR, an exclusive OR and additionally supplies the functions of reverse subtract, complement add, masked compare, and masked substitute (sometimes referred to as masked load), transfer addend, transfer augend, transfer complement addend, transfer complement augend, transfer zeros, and transfer ones. It accomplishes this additional functionality to the ALU by means of a third operand input which serves as a masking operand. It also optimizes the borrow and carry lookahead structure of an adder to provide high speed operation in a multiple ALU group design. Finally it eliminates the critical time nature of the mode control input to a multifunction ALU. Structurally, this is done by:

a. Incorporating a third operand into an adder in the form of a mask input to provide the functions of masked compare operations and field substitution operations commonly found in contemporary computer instruction repertoires. This is accomplished without impairing the basic speed of the adder.

b. Providing a means for optimizing the borrow/carry lookahead structure of an adder in a high speed environment.

c. Incorporating an internal clocked register for the mode control of an ALU.

This new arithmetic logic structure includes the advantages of:

a. Reducing the logic and logic levels and sequencing control normally associated with complex masked compare and field substitute operations, thereby improving machine performance and reducing cost.

b. Optimizing the time delay relationship between the borrow/carry lookahead structure of an adder and the normal thru delay internal to an adder subgroup, and c. Eliminating the mode control delay as the critical parameter in ALU delays.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. An arithmetic logic unit comprising:
   a. an integrated adder means comprised of a first half-adder means and a second full-adder means sequentially interconnected;
   b. a first operand means and a second operand means for respectively receiving first and second operands, both connected to said first half-adder means; and
   c. a masking means including a logical AND means also connected to said first half-adder means via said logical AND means to selectively inhibit portions of said first and second operands from entering said adder means and to integrate into said first half-adder means the logical AND function to thereby provide an arithmetic logic unit without additional logic levels over a non-masked adder means.

2. The invention as set forth in claim 1 wherein said first and second operand means are first and second complementing operand means connected to said adder means.

3. An arithmetic logic unit for use in a high speed environment of a data processing system comprising:
   a. an adder means having a first half-adder means and a second full-adder means sequentially interconnected;
   b. a first and a second operand means for receiving first and second operands respectively and connected to said first half-adder means of said adder means;
   c. a masking means including a logical AND means also connected to said first half-adder means via said logical AND means to selectively inhibit portions of the contents of said first and second operand means from entering said adder means and to integrate into said first half-adder means the logical AND function; and
   d. an internal control means connected to said adder means, said first and second operand means, and said masking means to control the data flow therethrough to thereby provide an arithmetic logic unit without additional logic levels over a non-masked adder means.

4. The invention as set forth in claim 3 further including a subtracting means connected to said adder means, and an output selection means commonly connected to said adder means and said subtracting means whereby selected portions of the data output from said adder means may be reduced prior to its passage to said output selection means.

5. An arithmetic logic unit for use in the high speed environment of a data processing system comprising:
   a. an adder means including a first half-adder means and a second full-adder means sequentially interconnected such that said half-adder output is coupled into the input of said full-adder means;
   b. a first and a second complementing means connected to said adder means;
   c. a masking means also connected to said adder means to selectively inhibit portions of the data contents from entering said adder means;
   d. an output selection means further connected to said adder means to provide selected outputs from said adder means;
   e. a means connected between said adder means and said output selection means to selectively subtract a one from portions of the data leaving said adder and entering said output selection means; and
   f. a control means connected to said adder means, said masking means, said first and said second complementing means, and said output selection means to control the passage of data through said arithmetic logic unit.

6. A masked arithmetic unit for use in a high speed environment of a data processing system comprising:
   a. an adder means having input and output terminals, said adder means including a first half-adder means and a second full-adder means sequentially interconnected;
   b. a first and a second complementer operand means connected to said adder input terminals;
   c. a masking means also connected to the input terminals of said adder means to inhibit selected portions of the contents of said first and second complementer operand means from entering said adder means;
   d. an output selection means connected to the output terminals of said adder means;
   e. a minus one network connected between said output terminals of said adder means and said output selection means to selectively subtract a one from selected portions of the data leaving said adder output terminal and to apply the reduced result to said output selection means; and
   f. an internal control means interconnected within said arithmetic unit to internally control the passage of data sequentially passing therethrough.

7. A masked high speed arithmetic logic unit comprising:
   a. an adder means having input and output terminals wherein said adder means includes a half-adder means and a full-adder means sequentially interconnected;
   b. a first and a second complementing means connected to said adder means input terminals;
   c. an input signal masking means also connected to said adder means input terminals to selectively inhibit portions of the contents of said first and second complementing means from entering said adder means;
   d. an output selection means connected to the output terminals of said adder means to sequentially receive selected data portions from said output terminals of said adder means;
   e. a means connected between said output terminals of said adder and said output selection means to selectively subtract a one from portions of data received from the output terminals of said adder means; and
   f. an internal control mode means connected to said adder means said first and said second complementing means, said masking means and said output selection means to thereby internally control the sequence of data flow through said arithmetic logic unit.

8. A masked high-speed arithmetic logic unit for use in processing system comprising:
   a first and second operand means for receiving operands;

b. adder means including half-adder means and full-adder means sequentially interconnected for adding operands applied to it;

c. first and second complementing operand means, each having output means connected to said half-adder means to provide input operands thereto and each having input means connected to an associated one of said first and second operand means;

d. masking means connected to said half-adder means to selectively inhibit portions of said first and second complementing operands from entering said half-adder means;

e. group borrow and propagate means connected between said sequentially interconnected half and full-adder means to receive borrow and propagated bits from said half-adder and to combine said individual bits into groups;

f. output selection means connected to said full-adder to sequentially receive data portions from said full-adder and simultaneously provide its complete contents as a logic output;

g. subtracting network connected between said full-adder and said output selection means to selectively subtract a one from any or all data portions leaving said full-adder;

h. internal control means connected to said first and second complementing operand means, said masking means, said half-adder means, said full-adder means, and said output selection means to thereby provide local mode control signals within said arithmetic logic unit.

9. A masked high-speed arithmetic logic unit for use in a processing system comprising:

a. first and second operand means for receiving operands;

b. adder means including half-adder means and full-adder means sequentially interconnected for adding operands applied to it;

c. first and second complementing operand means, each having output means connected to said half-adder means to provide input operands thereto; and each having input means respectively connected to corresponding one of said first and second operand means;

d. masking means connected to said half-adder means to selectively inhibit portions of said first and second complementing operands from entering said half-adder means;

e. group borrow and propogate means connected between said sequentially interconnected half and full-adder means to receive borrow and propogated bits from said half-adder and to combine said individual bits into groups;

f. output selection means connected to said full-adder to sequentially receive data portions from said full-adder and simultaneously provide its complete contents a a logic output;

g. subtracting network connected between said full-adder and said output selection means to selectively subtract a one from any or all data portions leaving said full-adder;

h. internal control means connected to said first and second complementing operands, said masking means, said half-adder means, said full-adder means, and said output selection means to thereby provide local mode control signals within said arithmetic logic unit; and i. a separate group borrow and propogate means connected to said half-adder means to receive individual borrow and propogate bits therefrom and to combine said individual bits into groups of borrow and propogation signals for subsequent output therefrom.

10. A masked arithmetic logic unit with an optimized borrow/carry lookahead adder structure and having improved mode control timing characteristics comprising:

a. first and second operand means for receiving operands:

b. half-adder means, including means capable of borrow bit generation and propagation for adding operands applied to it;

c. full-adder means connected to said half-adder means to receive therefrom partial sums, generated and propagated borrow bits;

d. means connected to the interconnection between said half-adder means and said full-adder means to also receive said borrowed bits generated and propagated by said half-adder means, for combining said generated and propagated borrow bits into groups;

e. first and second complementing operand means, each having output means connected to said half-adder means to supply thereto a first and a second complemented operand and each having input means connected to an associated one of said first and second operand means;

f. masking means connected to said half-adder means for inhibiting selected portions of said first and second complementer operands from entering said half-adder means;

g. subtracting means connected between said full-adder means and said output selection means for receiving data portions therefrom and subtracting a one from each of said portions before applying said data portions to said output selection means;

h. subtracting means connected between said full-adder means and said output selection means for receiving data portions therefrom and subtracting a one from each of said portions before applying said data portions to said output selection means;

i. arithmetic logic unit internal mode control means connected to receive external clock signals and external mode control signals and to internally apply a plurality of control signals individually to said first and second complementer operand means, said masking means, said half-adder means, said full-adder means and to said output selection means to thereby operably control the rapid passage of data through said arithmetic logic unit through the ready presence of internal control signals.

* * * * *